(12) United States Patent  
Logunov et al.

(10) Patent No.: US 11,059,747 B2  
(45) Date of Patent: Jul. 13, 2021

(54) LIGHT DIFFUSING OPTICAL FIBERS FOR EMITTING WHITE LIGHT

(71) Applicant: CORNING INCORPORATED, Corning, NY (US)

(72) Inventors: Stephan Lvovich Logunov, Corning, NY (US); Manuela Ocampo, Corning, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 16/496,625

(22) PCT Filed: Mar. 28, 2018

(86) PCT No.: PCT/US2018/024744  
§ 371 (c)(1),  
(2) Date: Sep. 23, 2019

(87) PCT Pub. No.: WO2018/183434  
PCT Pub. Date: Oct. 4, 2018

(65) Prior Publication Data  
US 2020/0216356 A1 Jul. 9, 2020

Related U.S. Application Data

(60) Provisional application No. 62/595,722, filed on Dec. 7, 2017, provisional application No. 62/477,649, filed on Mar. 28, 2017.

(51) Int. Cl.  
*C03C 25/475* (2018.01)  
*F21V 8/00* (2006.01)  
(Continued)

(52) U.S. Cl.  
CPC ............ *C03C 25/475* (2018.01); *G02B 6/001* (2013.01); *G02B 6/0003* (2013.01);  
(Continued)

(58) Field of Classification Search  
CPC ............... C03C 25/475; G02B 6/0003; G02B 6/02361; G02B 6/0229; G02B 6/001; G02B 6/02366; G02B 6/03694  
See application file for complete search history.

(56) References Cited

U.S. PATENT DOCUMENTS 6,374,023 B1 * 4/2002 Parris .................. G02B 6/4492  
                                              385/100  
7,269,318 B2 * 9/2007 Cook .................. G02B 6/4482  
                                              385/100  
(Continued)

FOREIGN PATENT DOCUMENTS

| CN | 102667551 A | 9/2012 |
|---|---|---|
| CN | 103649270 A | 3/2014 |
| WO | 2017087771 A1 | 5/2017 |

OTHER PUBLICATIONS

Choi et al; "Assessment of White for Displays Under Dark—and Chromatic-Adapted Conditions" ; Optics Express; vol. 24, No. 25, (2016) 14 Pages.  
(Continued)

*Primary Examiner* — Andrew Jordan  
(74) *Attorney, Agent, or Firm* — Svetlana Z. Short; Payal A. Patel

(57) ABSTRACT

A light diffusing optical fiber includes a glass core, a cladding, a phosphor layer surrounding the cladding, and a plurality of scattering structures positioned within the glass core, the cladding, or both. The phosphor layer includes two or more phosphors and is configured to convert guided light diffusing through the phosphor layer into emission light such that the color of the emission light has a chromaticity within a u'-v' chromaticity region on a CIE 1976 chromaticity space defined by: a first u'-v' boundary line and a second u'-v' boundary line that extend parallel to a planckian locus at a distance of ±0.02 Duv from the planckian locus, a third u'-v'  
(Continued)

boundary line that extends along an isothermal line for a correlated color temperature of about 2000 K, and a fourth u'-v' boundary line that extends along an isothermal line for a correlated color temperature of about 10000 K.

19 Claims, 11 Drawing Sheets

(51) Int. Cl.
*G02B 6/02* (2006.01)
*G02B 6/036* (2006.01)

(52) U.S. Cl.
CPC ....... *G02B 6/0229* (2013.01); *G02B 6/02361* (2013.01); *G02B 6/02366* (2013.01); *G02B 6/03694* (2013.01)

(56) References Cited

U.S. PATENT DOCUMENTS

| | | | |
|---|---|---|---|
| 7,450,806 B2 | 11/2008 | Bookbinder et al. | |
| 7,930,904 B2 * | 4/2011 | Bookbinder | C03B 37/01446 65/379 |
| 8,502,445 B2 * | 8/2013 | Levermore | H01L 27/3213 313/504 |
| 8,545,076 B2 * | 10/2013 | Bickham | G02B 6/0003 362/558 |
| 8,591,087 B2 | 11/2013 | Bickham et al. | |
| 8,620,125 B2 | 12/2013 | Button et al. | |
| 8,704,440 B2 * | 4/2014 | Zheng | C09K 11/0883 313/501 |
| 8,796,952 B2 * | 8/2014 | Van de Ven | H05B 45/20 315/297 |
| 8,805,141 B2 | 8/2014 | Fewkes et al. | |
| 8,998,444 B2 * | 4/2015 | Roberts | F21K 9/00 313/503 |
| 9,025,923 B2 * | 5/2015 | Logunov | G02B 6/001 385/123 |
| RE46,098 E * | 8/2016 | Bickham | G02B 6/0003 |
| 9,857,515 B2 * | 1/2018 | Tyagi | G02B 6/0003 |
| RE47,499 E * | 7/2019 | Bickham | G02B 6/02361 |
| 10,921,539 B2 * | 2/2021 | Brown | G02B 6/4469 |
| 2005/0213901 A1 * | 9/2005 | Cook | G02B 6/4483 385/102 |
| 2007/0104437 A1 * | 5/2007 | Bookbinder | G02B 6/02357 385/125 |
| 2009/0032983 A1 * | 2/2009 | Bookbinder | C03B 37/02781 264/1.24 |
| 2010/0079059 A1 | 4/2010 | Roberts et al. | |
| 2011/0122646 A1 | 5/2011 | Bickham et al. | |
| 2011/0305035 A1 * | 12/2011 | Bickham | C03C 25/475 362/558 |
| 2012/0223657 A1 | 9/2012 | Van de Ven | |
| 2012/0275180 A1 * | 11/2012 | Button | G02B 6/02295 362/558 |
| 2013/0009541 A1 | 1/2013 | Zheng et al. | |
| 2013/0020933 A1 | 1/2013 | Levermore et al. | |
| 2013/0088888 A1 * | 4/2013 | Fewkes | G02B 6/001 362/558 |
| 2013/0156391 A1 | 6/2013 | Logunov et al. | |
| 2015/0062954 A1 | 3/2015 | Crossland et al. | |
| 2016/0025916 A1 | 1/2016 | Tyagi | |
| 2016/0187608 A1 * | 6/2016 | Brown | G02B 6/4469 356/73.1 |
| 2020/0216356 A1 * | 7/2020 | Logunov | G02B 6/0003 |
| 2020/0255787 A1 * | 8/2020 | Fewkes | C12M 21/02 |
| 2020/0257029 A1 * | 8/2020 | Fewkes | G02B 6/001 |

OTHER PUBLICATIONS

International Search Report and Written Opinion of the International Searching Authority; PCT/US2018/024744; dated Jul. 17, 2018; 27 Pages; European Patent Office.

Invitation to Pay Additional Fees From the International Searching Authority; PCT/US2018/024744; Mailed Jun. 8, 2018; 16 Pages; European Patent Office.

Smith et al; "The C.I.E. Colorimetric Standards and Their Use" ; 33 Trans. Op. Soc. 73-134 (1931).

Chinese Search Report; 201880035489.2; dated Jun. 28, 2020; 1 page; Chinese Patent Office.

* cited by examiner

LIGHT DIFFUSING OPTICAL FIBERS FOR EMITTING WHITE LIGHT

CROSS-REFERENCE TO RELATED APPLICATIONS07.54.1

This application claims the benefit of priority under 35 U.S.C. § 119 of U.S. Provisional Application Ser. No. 62/595,722 filed on Dec. 7, 2017 and U.S. Provisional Application Ser. No. 62/477,649 filed on Mar. 28, 2017, the content of each is relied upon and incorporated herein by reference in their entirety.

BACKGROUND

The present disclosure relates to light diffusing optical fibers. More specifically, the present disclosure relates to light diffusing optical fibers that include a phosphor layer for providing white light illumination.

BRIEF SUMMARY

A first aspect of this disclosure pertains to a light diffusion optical fiber exhibiting white light illumination. In one or more embodiments, the light diffusing optical fiber includes a glass core, a cladding surrounding the glass core, a phosphor layer surrounding the cladding, and a plurality of scattering structures positioned within the glass core, the cladding, or both the glass core and the cladding. The plurality of scattering structures are configured to scatter guided light toward the phosphor layer of the light diffusing optical fiber such that a portion of the guided light diffuses through the phosphor layer along a diffusion length of the light diffusing optical fiber. In one or more embodiments, the phosphor layer includes two or more phosphors and is configured to convert guided light diffusing through the phosphor layer into emission light such that the color of the emission light has a chromaticity within a u'-v' chromaticity region on a CIE 1976 chromaticity space defined by: a first u'-v' boundary line that extends parallel to a planckian locus at a distance of 0.02 Duv from the planckian locus, a second u'-v' boundary line that extends parallel to the planckian locus at a distance of −0.02 Duv from the planckian locus, a third u'-v' boundary line that extends between the first u'-v' boundary line and the second u'-v' boundary line along an isothermal line for a correlated color temperature of about 2000 K, and a fourth u'-v' boundary line that extends between the first u'-v' boundary line and the second u'-v' boundary line along an isothermal line for a correlated color temperature of about 10000 K.

A second aspect of this disclosure pertains to a method of manufacturing a phosphor layer for a light diffusing optical fiber. In one or more embodiments, the method includes forming a first test phosphor layer having a combination of a base material, a first phosphor, and a second phosphor combined at a first composition ratio and having a first phosphor layer thickness, directing light through the first test phosphor layer, and measuring a first chromaticity of light directed though the first test phosphor layer. In one or more embodiments, the method further includes forming a second test phosphor layer having a combination of the base material, the first phosphor, and the second phosphor combined at a second composition ratio and having a second phosphor layer thickness, in which the second composition ratio is different than the first composition ratio, the second phosphor layer thickness is different than the first phosphor layer thickness, or both the second composition ratio and the second phosphor layer thickness are different than the first composition ratio and the first phosphor layer thickness, respectively, such that light directed through the second test phosphor layer has a second chromaticity that is closer to a target chromaticity than the first chromaticity.

In accordance with yet another aspect of this disclosure, a light diffusing optical fiber includes a glass core, a cladding surrounding the glass core, a phosphor layer surrounding the cladding, and a plurality of scattering structures positioned within the glass core, the cladding, or both the glass core and the cladding. The plurality of scattering structures are configured to scatter guided light toward the phosphor layer of the light diffusing optical fiber such that a portion of the guided light diffuses through the phosphor layer along a diffusion length of the light diffusing optical fiber. Further, in one or more embodiments, the phosphor layer includes two or more phosphors and is configured to convert guided light diffusing through the phosphor layer into emission light such that the color of the emission light has a chromaticity within an x-y chromaticity region on a CIE 1931 chromaticity space defined by: a first x-y boundary line that extends from a first x-y chromaticity point located between about (0.15, 0.0) and (0.25, 0.0) and a second x-y chromaticity point located at about (0.4, 0.6) and a second x-y boundary line that extends from the first x-y chromaticity point and a third x-y chromaticity point located at about (0.6, 0.4).

Although the concepts of the present disclosure are described herein with primary reference to light diffusing optical fibers having phosphor layers for white light illumination, it is contemplated that the concepts will enjoy applicability to any light diffusing optical fiber.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which.

DETAILED DESCRIPTION

Figure 1:
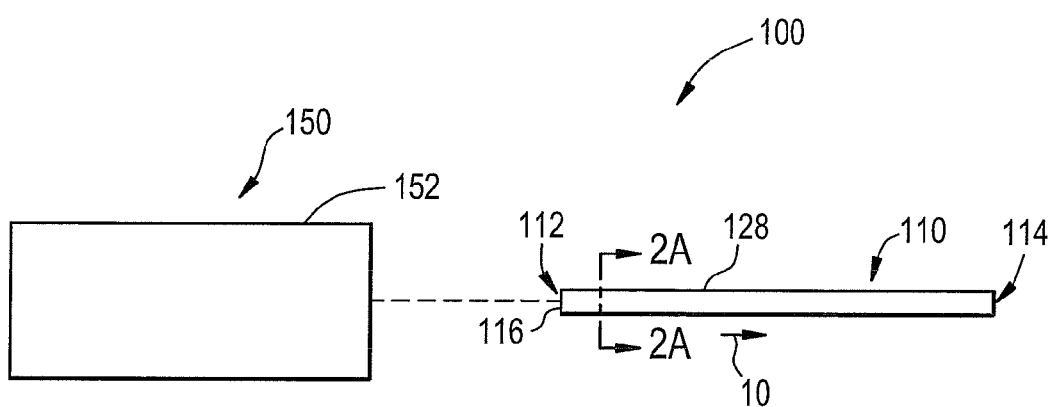
FIG. 1 schematically depicts an illumination system comprising a light output device and a light diffusing optical fiber, according to one or more embodiments shown and described herein.
Figure 2A:
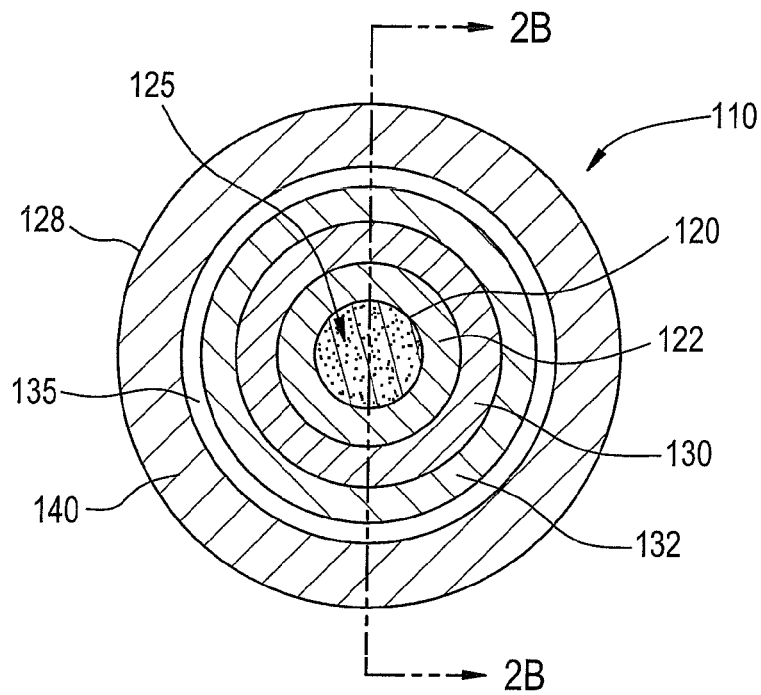
FIG. 2A schematically depicts a cross section of a light diffusing optical fiber, according to one or more embodiments shown and described herein.
Figure 2B:
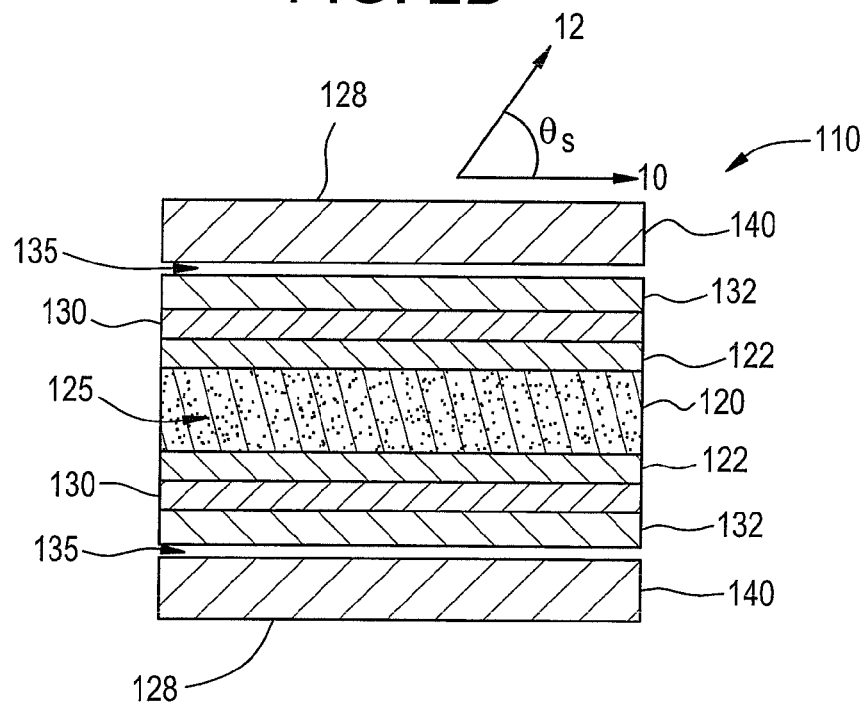
FIG. 2B schematically depicts another cross section of a light diffusing optical fiber, according to one or more embodiments shown and described herein.

Referring now to FIGS. 1, 2A, and 2B an illumination system 100 comprising a light diffusing optical fiber 110 optically coupled to a light output device 150 that includes a light source 152 is schematically depicted. The light diffusing optical fiber 110 comprises a first end 112, a second end 114 opposite the first end 112, a core 120, a cladding 122 surrounding the core 120, a secondary scattering layer 132, a phosphor layer 140, an outer surface 128, and a plurality of scattering structures 125 positioned within the core 120, the cladding 122, or both the core 120 and the cladding 122. The plurality of scattering structures 125 are configured to scatter guided light (e.g., light output by the light output device 150 that is propagating along the light diffusing optical fiber 110 from one of the first end 112 and the second end 114 toward the other of the first end 112 and the second end 114) toward the outer surface 128 of the light diffusing optical fiber 110 such that a portion of the guided light diffuses through the outer surface 128 along a diffusion length of the light diffusing optical fiber 110. As used herein, "diffusion length," is the length of the light diffusing optical fiber 110 extending from the first end 112 of the light diffusing optical fiber 110 (or from any end receiving input light) to a location along the length of the light diffusing optical fiber 110 where 90% of the guided light has diffused from the light diffusing optical fiber 110. In one or more embodiments, the diffusion length may be 10% or greater, 20% or greater, 30% or greater, 40% or greater, 50% or greater, 60% or greater, 70% or greater, 80% or greater, 90% or greater, 95% or greater, or about 100% of length of the fiber from the first end 112 to the second end 114. Further, the phosphor layer 140 is configured to alter the color of the guided light diffusing through the phosphor layer 140 such that the light emitted outward from the outer surface 128 of the light diffusing optical fiber 110 (e.g., emission light) comprises a white or near white colored light, as described in more detail herein.

Referring still to FIGS. 1, 2A, and 2B, "outer surface 128" refers to the outermost surface of the light diffusing optical fiber 110. For example, in the embodiments depicted in FIGS. 2A and 2B, the outer surface 128 is a surface of the phosphor layer 140, however, it should be understood that other embodiments may comprise additional layers spaced radially outward from the phosphor layer 140, for example, additional transparent coatings, jackets, and the like, such that the outer surface 128 is a surface of a different layer of the light diffusing optical fiber 110. Further, as used herein, the term "light-diffusing" means that light scattering is substantially spatially continuous along at least a portion of the length of the light diffusing optical fiber 110, i.e., there are no substantial jumps or discontinuities such as those associated with discrete (e.g., point) scattering. Thus, the concept of substantially continuous light emission or substantially continuous light scattering as set forth in the present disclosure refers to spatial continuity.

As depicted in FIG. 1, the light output device 150 is optically coupled to the first end 112 of the light diffusing optical fiber 110 such that light output by the light source 152 of the light output device 150 may irradiate an end face 116 of the first end 112 of the light diffusing optical fiber 110 and enter the light diffusing optical fiber 110. In some embodiments, additional light output devices 150 may be optically coupled to the light diffusing optical fiber 110, for example, to the second end 114 of the light diffusing optical fiber 110. The light source 152 may comprise a light-emitting diode (LED), a laser diode, or the like. For example, the light source 152 may comprise a multimode laser diode, single mode laser diode, a SiP laser diode, a VCSEL laser diode, or another type of semiconductor laser diode.

In some embodiments, the light source 152 may be configured to generate light in the 200 nm to 2000 nm wavelength range. For example, the light source 152 may be an ultraviolet (UV) or near UV light source configured to emit light at a wavelength of from about 300 nm to about 550 nm, from about 320 nm to about 550 nm, from about 340 nm to about 550 nm, from about 350 nm to about 550 nm, from about 360 nm to about 550 nm, from about 380 nm to about 550 nm, from about 400 nm to about 550 nm, from about 300 nm to about 540 nm, from about 300 nm to about 530 nm, from about 300 nm to about 520 nm, from about 300 nm to about 500 nm, from about 300 nm to about 480 nm, from about 300 nm to about 460 nm, from about 300 nm to about 450 nm, from about 300 nm to about 440 nm, from about 300 nm to about 420 nm, from about 300 nm to about 410 nm or from about 390 nm to about 410 nm. Exemplary wavelengths include, for example, about 300 nm, 325 nm, 350 nm, 375 nm, 400 nm, 405 nm, 415 nm, 425 nm, 435 nm, 445 nm, 450 nm, 475 nm, 500 nm, 525 nm, 550 nm or the like. The light output device 150 may further comprise additional optical components such a lens, an optical delivery fiber, or the like, positioned between and optically coupled to the light source 152 and the first end 112 of the light diffusing optical fiber 110 to facilitate the input of light into the light diffusing optical fiber 110. Moreover, these additional optical components, such as an optical delivery fiber, may allow the light source 152 to be spatially separated from the light diffusing optical fiber 110.

In operation, because light emitted by the light source 152 is scattered into the surrounding environment by the light diffusing optical fiber 110, the light source 152 may be positioned at a location remote from the light diffusing optical fiber 110. Accordingly, any thermal heat generated by the light source 152 may be transferred away from the light source 152 to locations remote from both the light source 152 and the light diffusing optical fiber 110. Thus, the temperature of the light diffusing optical fiber 110 may remain substantially similar to the ambient temperature of the surrounding environment and the lighting unit may be described as a thermally "cool" lighting unit. Further, spatially separating the light diffusing optical fiber 110 and the light source 152 may provide additional design flexibility to the illumination system 100.

Referring again to FIGS. 1, 2A, and 2B, in some applications, there is a desire to output white light from the light diffusing optical fiber 110. For example, light diffusing optical fibers 110 configured to output uniform white light could be used as a replacement for the CCFLs used in LCD backlight electronic devices, other electronic devices, or any other known or yet to be developed application of white light. Further, light diffusing optical fibers 110 configured to output white light may be advantageous because the light diffusing optical fibers 110 are much thinner (e.g., comprise a small diameter) than light emitting devices previously used to output white light (such as CCFLs), allowing the light diffusing optical fibers 110 described herein to be used to illuminate small components, such as thin substrates of an electronic device.

While not intending to be limited by theory, the color of light (for example, light emitted by the light source 152 of the light output device 150 and light scattered outward from the light diffusing optical fiber 110) may be characterized by its chromaticity. As used herein, "chromaticity" refers to the quality of the color of the light independent of brightness. Chromaticity is a combination of the hue and saturation of the color of the like, where hue refers to a color as perceived by a viewer (e.g., red, orange, green, blue, etc.) and saturation refers to the vividness or dullness of the color, for example, how close the color is to either gray or a pure hue of the color.

Figure 3:
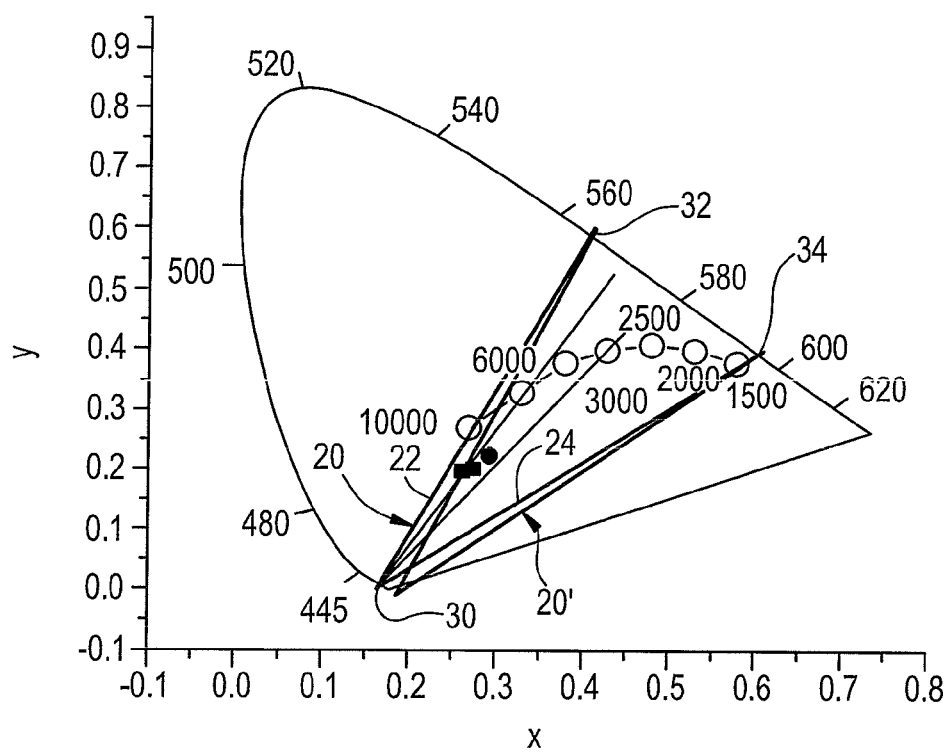
FIG. 3 graphically depicts a CIE 1931 chromaticity space, according to one or more embodiments shown and described herein.
Figure 4:
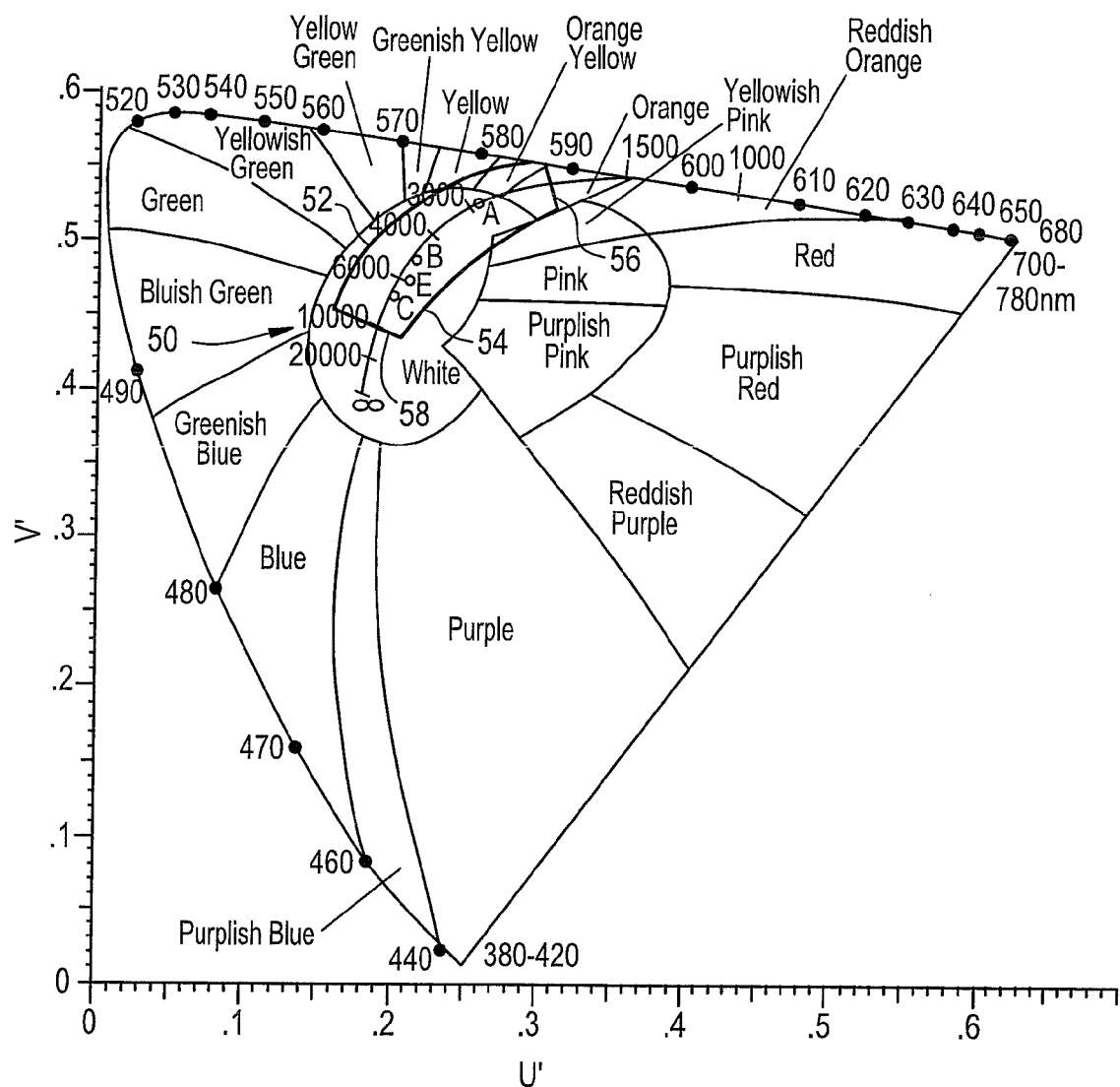
FIG. 4 graphically depicts a CIE 1976 chromaticity space, according to one or more embodiments shown and described herein.

Referring now to FIGS. 3 and 4, chromaticity may be plotted on a chromaticity space, for example, the CIE 1931 chromaticity space (FIG. 3) or the CIE 1976 chromaticity space (FIG. 4). Portions of these chromaticity spaces are referred to herein as "chromaticity regions." While not intending to be limited by theory, the CIE 1931 chromaticity space depicts chromaticity using chromaticity coordinates x and y, which are based on standard tristimulus values (XYZ), as set by the Commission Internationale de l'Eclairage (CIE), see T. Smith and J. Guild, *The C.I.E. Colorimetric Standards and Their Use*, 33 TRANS. OP. SOC. 73-134 (1931), herein incorporated by reference in its entirety. While not intending to be limited by theory, the tristimulus values are a mathematical construct to uniquely represent a perceivable hue and are derived from the relative intensities of the primary colors. Moreover, while still not intending to be limited by theory, the tristimulus values may be converted into the chromaticity coordinates x and y to depict chromaticity in two dimensional coordinates using the CIE 1931 chromaticity space.

Further, the CIE 1976 chromaticity space depicts chromaticity using coordinates u' and v', which represent differences in perceived chromaticity (e.g., chromaticity as perceived by a viewer). The u' and v' coordinates may be derived from the x and y coordinates of the CIE 1931 chromaticity space and may be used to show differences in chromaticity as geometric distances. Thus, the u' and v' coordinates may be used to spatially represent how different one chromaticity is from another chromaticity. The CIE 1976 chromaticity space is described in more detail in *Colorimetry*, second edition: CIE publication 15.2, Vienna: Bureau Central CIE, 1986, herein incorporated by reference in entirety.

While still not intending to be limited by theory, both the CIE 1931 chromaticity space and the CIE 1976 chromaticity space depict a "planckian locus," which represents the chromaticity of light emitted by a black body when the black body is heated over a range of temperatures. As described below, the planckian locus provides a reference location of white light and near white light within a chromaticity space. While not intending to be limited by theory, a "black body" refers to a theoretical object that absorbs all electromagnetic radiation comprising a range of wavelengths irradiating the black body, for example, the wavelengths of visible light. Because the black body absorbs electromagnetic radiation, the black body also emits electromagnetic radiation at temperatures above absolute zero (e.g., above 0° Kelvin (K)).

Further, electromagnetic radiation emitted by the black body is white or near white and the particular chromaticity and spectral distribution of this emitted white or near white electromagnetic radiation depends on the temperature of the black body. The temperature of back body emission is referred to as a "color temperature" and each color temperature defines the chromaticity of light located on the planckian locus (e.g., each color temperature defines the specific white or near white chromaticity of light located on the planckian locus). While not intended to be limited by theory, as the temperature of the black body increases, the spectral distribution shifts toward the shorter wavelengths and, as such, for higher temperatures, the chromaticity shifts toward blue hues and for lower temperatures, the chromaticity shifts toward the red hues.

Moreover, while color temperature defines the chromaticity of light located on the planckian locus, other chromaticities (e.g., a chromaticity of interest") may be defined by a "correlated color temperature," which is the color temperature of the point on the planckian locus that is nearest the chromaticity of interest when the planckian locus is plotted using the u'-v' coordinates of the CIE 1976 chromaticity space (e.g., because the u'-v' coordinates spatially represent the differences in chromaticity as geometric distances). Moreover, as used herein, a line on the CIE 1976 chromaticity space extending between and/or through the chromaticity of interest and the point nearest the chromaticity of interest on the planckian locus (e.g., extending perpendicular to a tangent line at the point nearest the chromaticity of interest on the planckian locus) is referred to as an "isothermal line." Each chromaticity point along an isothermal line has the same correlated color temperature.

As used herein, a dimensionless distance between two chromaticity points on a chromaticity space (e.g., the CIE 1931 chromaticity space or the CIE 1976 chromaticity space) is referred to as a "chromaticity distance." For example, when comparing a measured chromaticity to a target chromaticity, the chromaticity distance may be used may be used to define the distance therebetween on the CIE 1931 chromaticity space or the CIE 1976 chromaticity space. One example chromaticity distance is the distance between a chromaticity of interest and a point on the planckian locus nearest the chromaticity of interest (e.g., a distance measured along an isothermal line), which is referred to herein and in the art as the distance u-v or "Duv." The Duv is a positive or negative dimensionless number, where a positive Duv refers to points above the planckian locus on the CIE 1976 chromaticity space and a negative Duv refers to points below the planckian locus on the CIE 1976 chromaticity space. While the Duv is one example chromaticity distance, it should be understood that chromaticity distance may refer to the distance between any two points on a chromaticity space or between a point on the chromaticity space and a line on the chromaticity space (such as an isothermal line). As one non-limiting example, the chromaticity distance may be measured between an individual chromaticity point and an isothermal line representing a particular color coordinated temperature (e.g., the shortest distance between the chromaticity point and any location along the isothermal line). As another non-limiting example, the chromaticity distance may be measured two individual chromaticity points.

Referring now to FIGS. 2A and 2B, cross sections of an embodiment of the light diffusing optical fiber 110 comprising the core 120, the cladding 122 surrounding the core 120, the secondary scattering layer 132, the phosphor layer 140, and the plurality of scattering structures 125 are depicted. The core 120 may comprise a glass core, for example, silica, germania doped silica, fluorine-doped silica. Further, the core 120 comprises an index of refraction, n. In some embodiments, the index of refraction of the core 120 may be from about 1.3 to about 1.5, for example, 1.35, 1.4, 1.42, 1.44, 1.45, 1.458, 1.46, 1.48, or the like at 589 nm wavelength, sodium D-line. Further, in one or more embodiments, the core 120 may have a radius of from about 10 μm to about 600 μm. In some embodiment the radius of the core 120 is from about 30 μm to about 400 μm. In other embodiments, the radius of the core 120 is about 125 μm to about 300 μm. In still other embodiments, the radius of the core 120 is about 50 μm, 60 μm, 70 μm, 80 μm, 90 μm, 100 μm, 120 μm, 140 μm, 160 μm, 170 μm, 180 μm, 200 μm, 220 μm, 240 μm, or 250 μm.

In one or more embodiments, the cladding 122 may be a glass cladding, for example, pure silica, F-doped silica, or F(fluorine)/B(boron) co-doped silica, or a polymer cladding. In one embodiment, the cladding 122 comprises a low index polymeric material such as UV or thermally curable fluoroacrylate, such as PC452 available from SSCP Co. Ltd 403-2, Moknae, Ansan, Kyunggi, Korea, or silicone. In other embodiments, the cladding 122 comprises a urethane acrylate, such as CPC6, manufactured by DSM Desotech, Elgin, Ill. In some embodiments, the cladding 122 comprises a high modulus coating.

As depicted in FIGS. 2A and 2B, the cladding 122 surrounds the core 120 in direct contact with the core 120. The cladding 122 generally extends from the outer radius of the core 120. In some embodiments described herein, the radial width of the cladding is greater than about 10 μm, greater than about 20 μm, greater than about 50 μm or greater than about 70 μm. In some embodiments, the cladding 122 has a thickness of about 10 μm, 20 μm, 30 μm, 40 μm, 50 μm, 60 μm, 70 μm, 80 μm, 90 μm, or 100 μm. The cladding 122 generally has an index of refraction which is less than the index of refraction of the core 120.

While not intending to be limited by theory, forming the cladding 122 from a material which has a low refractive index may increase the numerical aperture (NA) of the light diffusing optical fiber 110. For example, the light diffusing optical fiber 110 may comprise an NA of about 0.3 or more, 0.4 or more, 0.5 or more, or the like.

In one or more embodiments, the cladding 122 is a low index polymer cladding with a relative refractive index that is negative relative to the core (e.g., silica glass). For example, the relative refractive index of the cladding with respect to the core may be less than about −0.5% and in some embodiments less than −1%.

In one or more embodiments, the cladding 122 has a relative refractive index that is positive relative to the core. For example, the relative refractive index of the cladding with respect to the core may be more than about 0.5% and in some embodiments more than about 1%.

In some embodiments, the core 120, the cladding 122, or both may include an updopant or a downdopant. As used herein, an "updopant" is a dopant which has a propensity to raise the refractive index relative to pure undoped silica and a "downdopant" is a dopant which has a propensity to lower the refractive index relative to pure undoped silica. For example, the cladding 122 comprises a silica glass which is down-doped with a down-dopant, such as, for example, fluorine. Further, the light diffusing optical fiber 110 will may comprise a length (e.g., a length between the first end 112 and the second end 114) of from about 0.15 m to about 100 m, for example, about 100 m, 75 m, 50 m, 40 m, 30 m, 20 m, 10 m, 9 m, 8 m, 7 m, 6 m, 5 m, 4 m, 3 m, 2 m, 1 m, 0.75 m, 0.5 m, 0.25 m, 0.15 m, or 0.1 m.

Referring still to FIGS. 2A and 2B, the scattering structures 125 may comprise voids, such as gas filled voids, and/or scattering particles, such as ceramic materials, dopants, or the like. The scattering structures 125 may be disposed throughout the core 120 (as depicted in FIGS. 2A and 2B), or may be disposed near the interface of the core 120 and the cladding 122 (e.g., the core-cladding boundary), or may be disposed in an annular ring within the core 120. Some examples of light diffusing optical fibers 110 having scattering structures 125 (also referred to as "random air lines" or "nanostructures" or "nano-sized structures") are described in U.S. Pat. No. 7,450,806, and in U.S. patent application Ser. Nos. 12/950,045, 13/097,208, and 13/269,055, herein incorporated by reference in their entirety. Alternatively, the light diffusing optical fiber 110 may have a "roughened" core 120, where the irregularities on the surface of the core 120 at the core-cladding boundary causes light scatter. Other types of light diffusing optical fibers may also be utilized.

The scattering structures 125 are utilized to scatter light propagating in the core 120 of the light diffusing optical fiber 110 such that the light is directed radially outward from the core 120 through the outer surface 128, thereby illuminating the light diffusing optical fiber 110 and the space surrounding the light diffusing optical fiber 110. While not intending to be limited by theory, the scatter-induced attenuation may be increased by increasing the concentration of scattering structures 125, positioning scattering structures 125 throughout the light diffusing optical fiber 110, or in cases where the scattering structures 125 are limited to an annular ring positioned within the core 120, the cladding 122, or both, increasing the width of the annular ring comprising the scattering structures 125 and retaining the same density of scattering structures 125. Additionally, in compositions where the scattering structures 125 are helical, the scattering-induced attenuation may also be increased by varying the pitch of the helical scattering structures 125 over the length of the light diffusing optical fiber 110. Specifically, it has been found that helical scattering structures 125 with a smaller pitch scatter more light than helical scattering structures 125 with a larger pitch. The pitch of the helical scattering structures 125, as used herein, refers to the inverse of the number times the helical scattering structures 125 are wrapped or rotated around the long axis of the light diffusing optical fiber 110 per unit length.

In operation, the light diffusing optical fiber 110 may undergo scattering-induced attenuation (i.e., attenuation due to light lost through the outer surface 128 of the light diffusing optical fiber 110, not due to absorption of scattering particles within the core 120) about 0.2 dB/m or greater, for example from about 0.5 dB/m or greater, 0.6 dB/m or greater, 0.7 dB/m or greater, 0.8 dB/m or greater, 0.9 dB/m or greater, 1 dB/m or greater, 1.2 dB/m or greater, 1.4 dB/m or greater, 1.6 dB/m or greater, 1.8 dB/m or greater, 2.0 dB/m or greater, 2.5 dB/m or greater, 3.0 dB/m or greater, 3.5 dB/m or greater, 4 dB/m or greater, 5 dB/m or greater, 6 dB/m or greater, 7 dB/m or greater, 8 dB/m or greater, 9 dB/m or greater, 10 dB/m or greater, 15 dB/m or greater, 20 dB/m or greater, 25 dB/m or greater, 30 dB/m or greater, 35 dB/m or greater, 40 dB/m or greater, 45 dB/m or greater, 50 dB/m or greater, 55 dB/m or greater, 60 dB/m or greater, or the like at an illumination wavelength (e.g., the wavelength(s) of emitted radiation). In some embodiments, the average scattering loss of the light diffusing optical fiber 110 does not vary more than 40%, by more than 35%, by more than 30% or by more than 20% (i.e., the scattering loss is within +40% of the average scattering loss, for example within +35%, within +30%, within +25%, within +20%, within +15%, or within +10%) over any given fiber segment of the light diffusing optical fiber 110, for example, over any given fiber segment of from about 0.2 m to about 50 m, for example, 0.5 m, 1 m, 2 m, 5 m, 10 m, 15 m, 20 m, 25 m, 30 m, 35 m, 40 m, 45 m, or the like.

In embodiments in which the scattering structures 125 comprise gas filled voids, the light diffusing optical fiber 110 may comprise a large number of gas filled voids, for example more than 50, more than 100, or more than 200 voids in the cross section of the light diffusing optical fiber 110. The gas filled voids may contain, for example, $SO_2$, Kr, Ar, $CO_2$, $N_2$, $O_2$, or mixtures thereof, which lower the average refractive index in the region of the core 120, the cladding 122, or the core-cladding boundary that include gas filled voids. Further, the plurality of scattering structures 125 such as voids can be randomly or non-periodically disposed in the core 120, the cladding 122, or the core-cladding boundary, however, in other embodiments the voids may be periodically disposed. Further, the gas filled voids may run parallel to the length of the light diffusing optical fiber 110.

The cross-sectional size (e.g., diameter) of the scattering structures 125, such as gas filled voids may be from about 10 nm to about 10 µm and the length may vary from about 1 m to about 50 m. In some embodiments, the cross sectional size of the voids (or other scattering structures 125) is in a range from about 10 nm to about 9 µm, from about 10 nm to about 8 µm, from about 10 nm to about, from about 10 nm to about 5 µm, from about 10 nm to about 4 m, from about 10 nm to about 2 m, from about 20 nm to about 10 m, from about 40 nm to about 10 m, from about 50 nm to about 10 m, from about 60 nm to about 10 µm, from about 80 nm to about 10 µm, from about 2 µm to about 10 µm, from about 4 µm to about 10 µm, from about 6 µm to about 10 µm, or from about 8 µm to about 10 µm (e.g., about 10 nm, 20 nm, 30 nm, 40 nm, 50 nm, 60 nm, 70 nm, 80 nm, 90 nm, 100 nm, 120 nm, 140 nm, 160 nm, 180 nm, 200 nm, 250 nm, 300 nm, 400 nm, 500 nm, 600 nm, 700 nm, 800 nm, 1 µm, 2 µm, 3 µm, 4 µm, 5 µm, 6 µm, 7 µm, 8 µm, 9 µm, or 10 µm). In some embodiments, the length of the scattering structures 125 (e.g., voids) is in a range from about 1 µm to about 40 m, from about 1 µm to about 30 m, from aboupLh to about 20 m, from about 1 m to about 15 m, from about 1 m to about 10 m, from about 1 m to about 8 m, from about 1 m to about 6 m, from about 1 m to about 5 m, from about 1 m to about 4 m, from about 1 µm to about 2 m, from about 1 cm to about 50 m, from about 10 cm to about 50 m, from about 20 cm to about 50 m, from about 30 cm to about 50 m, from about 40 cm to about 50 m, from about 50 cm to about 50 m, from about 60 cm to about 50 m, from about 70 cm to about 50 m, from about 80 cm to about 50 m, from about 90 cm to about 50 m, from about 1 m to about 50 m, from about 5 m to about 50 m, from about 10 m to about 50 m, from about 15 m to about 50 m, from about 20 m to about 50 m, from about 30 m to about 50 m, or from about 40 m to about 50 m (e.g., about 1 µm, 2 µm, 3 µm, 4 µm, 5 µm, 6 µm, 7 µm, 8 µm, 9 µm, 10 µm, 20 µm, 30 µm, 40 µm, 50 µm, 60 µm, 70 µm, 80 µm, 90 µm, 100 µm, 200 µm, 300 µm, 400 µm, 500 µm, 600 µm, 700 µm, 800 µm, 900 µm, 1000 µm, 5 mm, 10 mm, 50 mm, 100 mm, 500 mm, 1 m, 5 m, 10 m, 20 m, or 50 m).

Further, the light diffusing optical fibers 110 described herein may be formed utilizing various techniques. For example, the core 120 can be made by any number of methods which incorporate scattering structures 125 such as voids or particles into the light diffusing optical fiber 110. For example, methods for forming an optical fiber preform with voids are described in, for example, U.S. patent application Ser. No. 11/583,098, which is incorporated herein by reference. Additional methods of forming voids may be found in, for example, U.S. application Ser. Nos. 12/950,045, 13/097,208, and 13/269,055, herein incorporated by reference. Generally, the light diffusing optical fiber 110 is drawn from an optical fiber preform with a fiber take-up system and exits the draw furnace along a substantially vertical pathway. In some embodiments, the light diffusing optical fibers 110 is rotated as it drawn to produce helical voids along the long axis of the fiber. As the light diffusing optical fiber 110 exits the draw furnace, a non-contact flaw detector may be used to examine the light diffusing optical fiber 110 for damage and/or flaws that may have occurred during the manufacture of the light diffusing optical fiber 110. Thereafter, the diameter of the light diffusing optical fiber 110 may be measured with non-contact sensor. As the light diffusing optical fiber 110 is drawn along the vertical pathway, the light diffusing optical fiber 110 may optionally be drawn through a cooling system which cools the light diffusing optical fiber 110 prior to the coatings (for example, the secondary scattering layer 132, the phosphor layer 140, and the like) being applied to the light diffusing optical fiber 110.

After the light diffusing optical fiber 110 exits the draw furnace or optional cooling system, the light diffusing optical fiber 110 enters at least one coating system where one or more layers (i.e., the cladding 122 in embodiments in which the cladding comprises a polymer, the secondary scattering layer 132, and/or the phosphor layer 140) are applied to the light diffusing optical fiber 110. As the light diffusing optical fiber 110 exits the coating system, the diameter of the optical fiber may be measured with non-contact sensor. Thereafter, a non-contact flaw detector is used to examine the light diffusing optical fiber 110 for damage and/or flaws in the coating that may have occurred during the manufacture of the light diffusing optical fiber 110.

Referring still to FIGS. 2A and 2B, the secondary scattering layer 132 may be positioned surrounding the core 120, the cladding 122 and configured to enhance the distribution and/or the nature of the light emitted radially from the core 120 and thereby the cladding 122. Further, the secondary scattering layer 132 may facilitate uniform color output from the phosphor layer 140 as a function of viewing angle. The secondary scattering layer 132 generally extends from the outer radius of the cladding 122. In some embodiments described herein, the radial width of the secondary scattering layer 132 is greater than about 1 µm, 2 µm, 3 m, 4 m, 5 m, 6 m, 7 µm, 8 m, 9 m, 10 µm, 20 µm, 30 µm, 40 µm, 50 µm, 60 µm, 70 µm, 80 µm, 90 µm, or 100 µm. In some embodiments, the secondary scattering layer 132 is in direct contact with the cladding 122 and in other embodiments, the secondary scattering layer 132 is radially spaced from the cladding 122, for example, one or more additional layers may be positioned between the cladding 122 and the secondary scattering layer 132 (such as a coating layer 130) or an air gap may be positioned between the cladding 122 and the secondary scattering layer 132.

The secondary scattering layer 132 includes a base material (for example, a polymer) and a scattering material (e.g., a scattering agent) positioned in the base material. In some embodiments, the base material comprises a polymer, for example, a liquid polymer or prepolymer material into which the scattering agent could be added, for example, an acrylate-based, such as CPC6, manufactured by DSM Desotech, Elgin, Ill., or silicone-based polymer. Moreover, during manufacture, the secondary scattering layer 132 may be applied to the light diffusing optical fiber 110 as a liquid and then converted to a solid after application to the light diffusing optical fiber 110.

The scattering material comprises a material that has a refractive index differential from the base material of the secondary scattering layer 132 (e.g. a base polymer), for example, a refractive index differential of more than 0.05 (e.g., the difference in refractive indices between the base material and the scattering material is greater than 0.05). In some embodiments, the difference in refractive indices between base material and the scattering material is at least 0.1. That is, the index of refraction of the scattering material may be at least 0.1 larger than the index of refraction of the base material (e.g., of the polymer or other matrix material) of the secondary scattering layer 132. In operation, the scattering material provides angle independent distribution of light scattered from the core 120 of the light diffusing optical fiber 110.

The scattering material can be solid particles (e.g., organic or inorganic solid particles), liquid droplets, or gas bubbles. Example solid organic particles include pigments, polymers, or any organic material that can be incorporated into the base material as a powder. If the scattering material is inorganic, the scattering particles can be, for example, pigments, oxides, or mineral fillers. Both organic and inorganic scattering particles can be generated, from grinding a solid, or may comprise small particles initially (for example, from emulsion polymerization or sol gels). In some embodiments, the solid scattering particles are inorganic oxides like silica ($SiO_2$), alumina ($Al_2O_3$), zirconia ($ZrO_2$), titania ($TiO_2$), cerium oxide ($CeO_2$), tin oxide ($SnO_2$), and antimony oxide ($Sb_2O_3$). For example, titania based scattering particles may be a white ink. Ground glass, ceramics, or glass-ceramics can also be utilized as scattering particles. Ground silicates or mineral fillers like quartz, talc, mullite, cordierite, clay, nepheline syenite, calcium carbonate, aluminum trihydrate, barium sulfate, wallastonite, mica, feldspar, pyrophyllite, diatomite, perlite, and cristobalite can utilized in the secondary scattering layer 132 as scattering material.

Further, scattering material may be generated in-situ, via crystallization and/or phase separation, for example, polyethylene, polypropylene, syndiotactic polystyrene, nylon, polyethylene terephthalate, polyketones, and polyurethanes where the urethane functional groups align and crystallize during solidification. For example, during the cure or solidification of the material that becomes the secondary scattering layer 132, crystals may form that function as light scattering sites. Further, when the secondary scattering layer 132 is cured and/or solidified, the material of the scattering layer (e.g., the base material and the scattering material) may become incompatible causing the material to phase separate, forming droplets or particles that can scatter light, thus forming scattering sites. Examples of these would be, but are not limited to, styrene-butadiene-styrene block copolymers, polymethyl methacrylate in polystyrene, and acrylonitrile-butadiene-styrene.

The average diameter of the scattering material may be from about 200 nm to about 10 µm, for example, 300 nm, 400 nm, 500 nm, 600 nm, 700 nm, 800 nm, 900 nm, 1 µm, 2 µm, 3 µm, 4 µm, 5 µm, 6 µm, 7 µm, 8 µm, 9 µm, 10 µm, or the like. In embodiments in which the scattering material comprises scattering particles, the cross-sectional size of the scattering particles within the secondary scattering layer 132 may comprise $0.1\lambda$ to $10\lambda$, where $\lambda$ is the wavelength of light propagating through the light diffusing optical fiber 110. In some embodiments, the cross-sectional size of the scattering particles is greater than $0.2\lambda$ and less than $5\lambda$, for example, between $0.5\lambda$ and to $2\lambda$. The amount of scattering particles can vary from about 0.005% to 70% by weight, for example, 0.01% to 60%, 0.02% to 50%, or the like. In general, the thinner the secondary scattering layer 132, the larger amount of scattering particles should to be present within the secondary scattering layer 132.

The concentration of the scattering particles may vary along the length of the light diffusing optical fiber 110 or may be constant and may be a weight percent sufficient to provide even (e.g., angle independent) scattering of the light. In some embodiments, the weight percentage of the scattering particles in the scattering layer comprises from about 1 weight percentage to about 50 weight percentage (e.g., about 1%, 2%, 3%, 4%, 5%, 6%, 7%, 8%, 9%, 10%, 11%, 12%, 13%, 14%, 15%, 16%, 17%, 18%, 19%, 20%, 25%, 30%, 35%, 40%, 45%, or 50%). In some embodiments, the scattering material may comprise a sublayer within the secondary scattering layer 132. For example, in some embodiments, the sublayer may have a thickness of about 1 µm to about 5 µm.

In operation, the secondary scattering layer 132 may facilitate uniform angular scattering over a large angular range (e.g., 40° to 120°, or 30° to 130°, or 15 to 150°). For example, unscattered, guided light propagates along the light diffusing optical fiber 110 from the light output device 150 in the propagation direction 10. Scattered light is shown exiting the light diffusing optical fiber 110 in direction 12 at a scattering angle $\theta_S$, which is the angular difference between the propagation direction 10 of guided light propagating along the light diffusing optical fiber 110 and the direction 12 of the scattered light when it leaves light diffusing optical fiber 110. In some embodiments, the intensities of the spectra when the scattering angle $\theta_S$ is between 15° and 150°, or 30° and 130° are within ±50%, ±30%, ±25%, ±20%, ±15%, ±10%, or ±5% as measured at the peak wavelength. In some embodiments, the intensities of the spectra when the scattering angle $\theta_S$ is between all angles within 30° and 130° or 40° and 120° are at least within +50%, for example ±30%, +25%, +20%, +15%, +10%, or +5% as measured at the peak wavelength. Accordingly, the light diffusing optical fiber 110 is configured to provide substantially uniform illumination due to scattering, such that the difference between the minimum and maximum scattering illumination intensity is less than 50% of the maximum scattering illumination intensity, for all viewing angles (e.g., an angle between the propagation direction 10 and a viewing location of the viewer) between at least 40 degrees and 110 degrees, for example for all viewing angles between 40 degrees and 120 degrees. According to some embodiments, the difference between the minimum and maximum scattering illumination intensity is not greater than 30% of the maximum scattering illumination intensity.

As depicted in FIGS. 2A and 2B, the light diffusing optical fiber 110 may further comprise one or more additional layers, for example, coatings, jackets, or the like. For example, the light diffusing optical fiber 110 may additionally comprise a coating layer 130 which may be a substantially clear layer surrounding the core 120 and cladding 122 for ease of mechanical handling, for example, a polymer coating. The coating layer 130 may be included in embodiments in which the secondary scattering layer 132 is applied after initial draw of the light diffusing optical fiber 110, for handling issues.

Referring still to FIGS. 2A and 2B the phosphor layer 140 surrounds the core 120, the cladding 122, and the secondary scattering layer 132. In some embodiments, the phosphor layer 140 is spaced apart from the secondary scattering layer 132 and an air gap 135 is positioned therebetween. In other embodiments, the phosphor layer 140 may be in direct contact with the secondary scattering layer 132. The phosphor layer 140 may be a buffer tube or jacket to provide additional functionality as a protective layer, however, it should be understood that the phosphor layer 140 is not limited to a buffer tube or a jacket and may be disposed at any radial location between the cladding and the outer surface 128 of the light diffusing optical fiber 110. The phosphor layer 140 may comprise an outer diameter of about 1.5 mm or less, for example, about 1.4 mm, 1.3 mm, 1.2 mm, 1.1 mm, 1.0 mm, 0.9 mm, 0.8 mm, 0.7 mm, 0.6 mm, 0.5 mm, 0.4 mm, or the like, and may comprise an inner diameter of 200 µm or greater, for example, about 210 µm or greater, 220 µm or greater, 230 µm or greater, 240 µm or greater, 250 µm or greater, 300 µm or greater, 400 µm or greater, 500 µm or greater, 600 µm or greater, 700 µm or greater, 800 µm or greater, 900 µm or greater, 1.0 mm or greater, 1.1 mm or greater, 1.2 mm or greater, 1.3 mm or greater, or the like. Moreover, the phosphor layer 140 may comprise a thickness of from about 200 µm and about 400 µm, for example, about 225 µm, 250 µm, 275 µm, 300 µm, 325 µm, 350 µm, 375 µm, or the like.

The phosphor layer 140 comprises a base material and two or more phosphors (e.g., fluorescent or phosphorescent materials) mixed into the base material. The base material may comprise a polymer, for example a liquid polymer, prepolymer material, or the like. Example polymers include an acrylate-based or silicone based polymer (e.g., CPC6 secondary coating). In some embodiments, for example, embodiments in which the phosphor layer 140 comprises a buffer tube, the base material comprises a thermoplastic polymer, for example a polyolefin, such as polyethylene, polypropylene or Apolhya® graft copolymer polyolefin from Arkema Corporation, Pebax® polyether block amide thermoplastic elastomers (TPE) from Arkema Corporation, other TPEs, polyvinyl chloride (PVC), polycarbonate, nylon (homo- and copolymers), thermoplastic urethanes (TPU) such as Pearlthane™ TPU from The Lubrizol Corporation, silicones, ethylene vinyl acetate (EVA) or EVA copolymers such as Elvax® from Dupont™, Elvaloy® from E. I. du Pont de Nemours and Company, copolyester resins such as Hytrel® from E. I. du Pont de Nemours and Company or Eastman Tritan™ from Eastman Chemical Company, fluorinated thermoplastics such as perfluoroalkoxy alkanes (PFA), fluorinated ethylene propylene (FEP), Ethylene tetrafluoroethylene (ETFE) such as Tefzel™ from Chemours Corporation, Polyvinylidene fluoride or polyvinylidene difluoride (PVDF) Polytetrafluoroethylene (PTFE). During environmental testing or aging that includes exposure of the light diffusing fiber or a polymer layer or base of the fiber to high temperatures (i.e. from about 70° C. to about 85° C. or to damp heat (at a temperature of 85° C. and 85% relative humidity or 60° C. and 90% relative humidity) for 100 hours (for 200 hours, for 300 hours, for 400 hours, for 500 hours, from 100 hours to 500 hours, or up to 2000 hours), polymers can discolor (i.e., turn yellow) due to degradation, which creates additional absorption at the spectral range from about 420 nm to about 460 nm. The temperature of the test or aging can be controlled with high accuracy (such as +/−5° C. or more preferable better than +/−2° C.). The same applies with the control of humidity (which should be +/−5 humidity %).

In one or more embodiments, the light diffusing fiber includes a polymer layer that is selected to resist such aging whether in isolation or as part of the light diffusing optical fiber. In one or more embodiments, the polymer is selected such that after the light diffusing fiber is aged by placing the fiber in a chamber having a temperature of 85° C. and 85% relative humidity for 100 hours, for 100 hours to 500 hours, or up to 2000 hours, and after a light source is optically coupled to the first end, the light diffusing fiber exhibits an optical loss that changes about 20% or less (e.g., 18% or less, 16% or less, 15% or less, 14% or less, 12% or less, 10% or less, 8% or less, 6% or less, 5% or less, 4% or less or 2% or less). In other words, the optical loss of the light diffusing optical fiber before aging and the optical loss of the light diffusing optical fiber after aging (as described herein) changes by 20% or less.

In one or more embodiments, the polymer is selected such that after the light diffusing fiber is aged by placing the fiber in a chamber having a temperature of 85° C. and 85% relative humidity for 100 hours, for 100 hours to 500 hours, or up to 2000 hours, and after a light source is optically coupled to the first end, the light diffusing fiber exhibits a scattering efficiency along the spectral range from 420 nm to 800 nm that changes about 10% or less (e.g., 9% or less, 8% or less, 7% or less, 6% or less, 5% or less, 4% or less, 3% or less or 2% or less). In other words, the scattering efficiency of the light diffusing optical fiber before aging and the scattering efficiency of the light diffusing optical fiber after aging (as described herein) changes by 10% or less.

In one or more embodiments, the polymer is selected such that after the light diffusing fiber is aged by placing the fiber in a chamber having a temperature of 85° C. and 85% relative humidity for 100 hours, for 100 hours to 500 hours, or up to 2000 hours, and after a light source is optically coupled to the first end, the light diffusing fiber exhibits a luminous efficiency that changes less than 20% (e.g., 18% or less, 16% or less, 15% or less, 14% or less, 13% or less, 12% or less, 10% or less, 8% or less or 5% or less). In other words, the luminous efficiency of the light diffusing optical fiber before aging and the luminous efficiency of the light diffusing optical fiber after aging (as described herein) changes by less than 20%.

In one or more embodiments, the polymer is selected such that after the light diffusing fiber is aged by placing the fiber in a chamber having a temperature of 85° C. and 85% relative humidity for 100 hours, for 100 hours to 500 hours, or up to 2000 hours, and after a light source is optically coupled to the first end, the light diffusing fiber exhibits a brightness at any given portion of the fiber along its length that changes less than about 25% (e.g., 24% or less, 22% or less, 20% or less, 18% or less, 16% or less, 15% or less, 14% or less, 12% or less, 10% or less, 8% or less, or 5% or less). In other words, the brightness of the light diffusing optical fiber at any given portion of the fiber along its length before aging and the brightness of the light diffusing optical fiber at any given portion of the fiber along its length after aging (as described herein) changes by less than about 25%. As light diffuses or penetrates through the buffer tube or secondary coating, the color temperature (CCT) may change after environmental test or aging (as described herein). In one or more embodiments of this disclosure, the optical fiber has a CCT change that is less than 400 K at 7000 K, or less than 200 K at 2500 K. In one or more embodiments, the emission light has a color point in the CIE 1976 chromaticity space that does not change after aging. In one or more specific embodiments, the color point shifts or changes from an original color point before aging to a color point after aging about 0.02 or less, or 0.01 or less, in Duv units. In one or more embodiments, overall the absorptance changes in the polymer with thickness of the target tube wall (i.e. between 100 µm and 400 µm) do not exceed 15%, do not exceed 10%, or do not exceed 7%. The absorptance change measurement test is applied for screening materials applicable for phosphor buffer tube and secondary coating materials or all polymer materials containing phosphor materials or on the path of the light after down converting of the blue light to the phosphor emission was made. Similar tests were made for phosphor tube materials without phosphor.

In one or more specific embodiments, the polymer comprises any one of ethylene vinyl acetate (EVA), polytetrafluoroethylene (PTFE), ethylene tetrafluoroethylene (ETFE), fluorinated ethylene propylene (FEP), polycarbonate, and a copolyester. In one or more specific embodiments, the polymer layer comprises EVA. The foregoing description and embodiments related to aging resistance are applicable where the polymer does not include any phosphor materials. Accordingly, a polymer layer as described herein that exhibits aging resistance when the phosphor material is optionally included and when the polymer layer is substantially free of phosphor material.

Further, the phosphor layer 140 may comprise a polymer coating and/or buffer layer (e.g., a thermoplastic polymer coating and/or buffer layer) with the two or more phosphors mixed therein.

The two or more phosphors of the phosphor layer 140 may comprise any organic or inorganic fluorescent or phosphorescent material, for example the two or more phosphors may comprise a garnet phosphor composition such as Ce-YAG, Nd-YAG, or the like, a nitride phosphor composition, an orthosilicate phosphor composition, a sulfoselenide phosphor composition, quantum dots, nanoparticles, metal-enhanced fluorescence of organic fluorophores, or the like. In some embodiments, the two or more phosphors comprise at least one a red phosphor and at least one yellow phosphor. While not intending to be limited by theory, yellow phosphors include sulfoselenide phosphor compositions and garnet phosphor compositions, such as Ce-YAG, Nd-YAG, or the like, and red phosphors include nitride phosphor compositions and orthosilicate phosphor compositions. Further, quantum dots may be yellow phosphors or red phosphors.

In some embodiments, the phosphor layer 140 further includes scattering material, such as the scattering material described above with respect to the secondary scattering layer 132. In these embodiments, the phosphor layer 140 may perform the uniform angular scattering functionality of the secondary scattering layer 132 such that the secondary scattering layer 132 may be omitted from the light diffusing optical fiber 110. However, it should be understood that some embodiments of the light diffusing optical fiber 110 include both the secondary scattering layer 132 and a phosphor layer 140 comprising scattering material. While not intending to be limited by theory, including scattering materials in the phosphor layer 140 may increase an interaction length of the light diffusing optical fiber 110. As used herein, the "interaction length" refers to the average pathlength that an individual photon will travel when traversing through one or more layers of the light diffusing optical fiber 110, such as the phosphor layer 140. For example, including scattering material in the phosphor layer 140 may induce an interaction length of up to about 3 times greater than the thickness of the phosphor layer 140.

The two or more phosphors may collectively comprise from about 5% to about 45% of the phosphor layer 140, for example, about 6%, 7.5%, 8%, 10%, 12.5%, 15%, 20%, 25%, 30%, 35%, 40%, or the like, and the base material may comprise from about 55% to about 85% of the phosphor layer 140, for example, about 60%, 65%, 70%, 75%, 80%, or the like. Moreover, the base material and each phosphor of the two or more phosphors may be mixed in a "composition ratio," which, as used herein, refers to the relative amounts of each of the base material, the phosphors of the two or more phosphors (e.g., a first phosphor and a second phosphor), and in some embodiments, the scattering material. As an illustration, one example embodiment may comprise a polymer base material, a red phosphor, a yellow phosphor, and scattering material, and the composition ratio may include 73.8% of the base material, 10% of the red phosphor, 15% of the yellow phosphor, and 1.2% of the scattering material, such as titania.

While not intending to be limited by theory, altering both the specific composition of the phosphor layer 140 (e.g., the specific base material and specific phosphors) and the composition ratio of the phosphor layer 140 may alter the resultant chromaticity of the emission light scattered outward from the core 120 through the phosphor layer 140. Additional factors may affect the resultant chromaticity of the emission light scattered outward from the core 120 through the phosphor layer 140, for example altering the thickness of the phosphor layer 140 and altering the wavelength of guided light propagating through the core 120 of the light diffusing optical fiber 110, for example, light output by the light source 152 of the light output device 150. In some embodiments, the chromaticity of the emission light does not vary by more than ±30% with scattering angle $\theta_S$ when scattering angle $\theta_S$ is from about 10° to about 170°, for example the chromaticity may vary within +30%, +25%, +20%, +15%, +10%, or +5% or the like, when scattering angle $\theta_S$ is from about 10° to about 170°.

In some embodiments, forming the phosphor layer 140 comprises mixing the base material with the two or more phosphors then applying the phosphor layer 140 to the light diffusing optical fiber 110. In some embodiments, the phosphor layer 140 may be applied to the light diffusing optical fiber 110 as a liquid and then converted to a solid after application. Further, it may be efficient to blend the two or more phosphors into a standard UV curable acrylate base material, such as Corning's standard CPC6 secondary optical fiber coating. In one example, the phosphor layer 140 may be formed by mixing 30% by weight of the two or more phosphors with a base material comprising DSM 950-111 secondary CPC6 optical fiber coating and then translating the mixture through a roll mill. However, it should be understood that the base material may comprise any of the base materials described above, for example, any UV curable acrylate polymer.

In operation, the phosphor layer 140 and in particular, the two or more phosphors of the phosphor layer 140, converts light scattered from the core 120 into a longer wavelength of light. Further, the phosphor layer 140 alters the chromaticity of light scattered from the core 120, such that emission light exiting the phosphor layer 140 and also exiting the light diffusing optical fiber 110 outward from the outer surface 128 may comprise a desired color of light, such as white or near white light. For example, white light can be emitted from the light diffusing optical fiber 110 by optically coupling the light diffusing optical fiber 110 comprising the phosphor layer 140 to a higher energy (lower wavelength) light source 152, such as a UV or near UV light source emitting at 405 nm or 445 nm. In operation, the guided light propagating along the core 120 of the light diffusing optical fiber 110 (e.g., UV light output by the light source 152) may be scattered from the core 120 causing the two or more phosphors of the phosphor layer 140 to fluoresce or phosphoresce such that the combination of UV light and emitted wavelengths of this fluoresce or phosphoresce produce an emission light that is white or nearly white. Further, in embodiments comprising two phosphors in the phosphor layer 140, the emission light may comprise a color rendering index of up to about 80, for example, a color rendering index of from about 71 to about 75. Further, by increasing the number of phosphors in the phosphor layer 140 to three or more, the color rendering index may be increased above 80.

Referring again to FIGS. 1-4, light output outward from the outer surface 128 of the light diffusing optical fiber 110 comprises a combination of the guided light propagating along the core 120, which is scattered outward toward the phosphor layer 140 by the scattering structures 125, and the scattered fluorescent or phosphorescent light caused by propagating of the guided light through the phosphor layer 140, thereby producing a combined light, e.g., the emission light, which may have a chromaticity within a chromaticity region such that the emission light appears as the desired color, such as white, to a viewer.

For example, FIG. 3 depicts a first x-y chromaticity region 20 on the CIE 1931 chromaticity space of an example phosphor layer 140 having a first phosphor comprising a yellow phosphor (e.g., Ce-YAG) and a second phosphor comprising a red phosphor (e.g., nitride). The first x-y chromaticity region 20 extends from a first x-y boundary line 22 to a second x-y boundary line 24. The first x-y boundary line 22 depicts the possible chromaticities when the phosphor layer 140 comprises a composition of only the base material and/or the first phosphor, where a first chromaticity point 30 depicts the chromaticity of the phosphor layer 140 having 100% base material and a second chromaticity point 32 depicts the chromaticity of the phosphor layer 140 having 100% of the first phosphor. Further, the second x-y boundary line 24 depicts the possible chromaticities when the phosphor layer 140 comprises a composition of only the base material and/or the second phosphor where the first chromaticity point 30 depicts the chromaticity of the phosphor layer 140 having 100% base material and a third chromaticity point 34 depicts the chromaticity of the phosphor layer 140 having 100% of the first phosphor.

In some embodiments, the first chromaticity point 30 may comprises an (x,y) point on the CIE 1931 chromaticity space of from about (0.15, 0.0) to about (0.25, 0.0). The second chromaticity point 32 may comprises an (x,y) point on the CIE 1931 chromaticity space of about (0.4, 0.6) and the third chromaticity point 34 may comprises an (x,y) point on the CIE 1931 chromaticity space of from about (0.6, 0.4). While the first x-y chromaticity region 20 depicts one example x-y chromaticity region, it should be understood that phosphor layers 140 configured to achieve other x-y chromaticity regions are contemplated. By altering the composition ratio of this example phosphor layer 140, any chromaticity within the first x-y chromaticity region 20 is possible. Further, FIG. 3 also depicts a second x-y chromaticity region 20', which shows the possible chromaticities of a phosphor layer 140 with the same composition as the phosphor layer 140 of the first x-y chromaticity region 20 but with a different thickness. As shown by the second x-y chromaticity region 20', the thickness of the phosphor layer 140 may alter the resultant chromaticity of light that traverses the phosphor layer 140. Further, the phosphor layer 140 may be configured such that the chromaticity of the emission light is located within the x-y chromaticity region (such as first x-y chromaticity region 20) for all viewing angles from about 15° to about 170° relative to the propagation direction 10 of the guided light.

Further, FIG. 4 depicts a u'-v' chromaticity region 50 on the CIE 1976 chromaticity space of an example phosphor layer 140. The u'-v' chromaticity region 50 is defined by a first u'-v' boundary line 52 that extends parallel to a planckian locus at a distance of 0.02 Duv from the planckian locus, a second u'-v' boundary line 54 that extends parallel to the planckian locus at a distance of −0.02 Duv from the planckian locus, a third u'-v' boundary line 56 that extends between the first u'-v' boundary line 52 and the second u'-v' boundary line 54 along an isothermal line for a correlated color temperature of about 2000 K, and a fourth u'-v' boundary line 58 that extends between the first u-v boundary line 52 and the second u'-v' boundary line 54 along an isothermal line for a correlated color temperature of about 10000 K. Further, the chromaticity of the emission light is located within the u'-v' chromaticity region 50 for all viewing angles from about 15° to about 170° relative to the propagation direction 10 of the guided light.

Referring still to FIG. 4, phosphor layers 140 configured to achieve other u'-v' chromaticity regions are contemplated. For example, a u'-v' chromaticity region defined by a first u'-v' boundary line that extends parallel to a planckian locus at a distance of 0.01 Duv from the planckian locus, a second u'-v' boundary line that extends parallel to the planckian locus at a distance of −0.01 Duv from the planckian locus, a third u'-v' boundary line that extends between the first u'-v' boundary line and the second u'-v' boundary line along an isothermal line for a correlated color temperature of about 2500 K, and a fourth u'-v' boundary line that extends between the first u'-v' boundary line and the second u'-v' boundary line along an isothermal line for a correlated color temperature of about 8000 K.

In one example embodiment, a phosphor layer 140 configured to facilitate emission of emission light having a target chromaticity defined by a color coordinated temperature of about 5300 K, either at the planckian locus or within about +0.02 Duv from the planckian locus may comprise a phosphor mixture of about 96% yellow phosphor (e.g., Ce-YAG) and about 4% red phosphor (e.g., nitride). Further, the phosphor mixture may be mixed with a base material and a scattering material. For example, phosphor layer 140 may comprise about 7.5% phosphor mixture, about 1.2% scattering material (e.g., titania), and about 91.3% base material (e.g., a thermoplastic polymer). Further, in this example embodiment, the phosphor layer 140 may comprise a thickness of about 260 µm and, when disposed on the light diffusing optical fiber 110, may comprise an outer diameter of about 750 µm.

In another example embodiment, a phosphor layer 140 configured to facilitate emission of emission light having a target chromaticity defined by a color coordinated temperature of about 3300 K, either at the planckian locus or within about +0.02 Duv from the planckian locus may comprise a phosphor powder mixture of about 88% yellow phosphor (e.g., Ce-YAG) and about 12% red phosphor (e.g., nitride). Further, the phosphor mixture may be mixed with a base material and a scattering material. For example, phosphor layer 140 may comprise about 12.5% phosphor mixture, about 1.2% scattering material (e.g., titania), and about 86.8% base material (e.g., a thermoplastic polymer). Further, in this example embodiment, the phosphor layer 140 may comprise a thickness of about 200 µm and, when disposed on the light diffusing optical fiber 110, may comprise an outer diameter of about 630 m.

Figure 5:
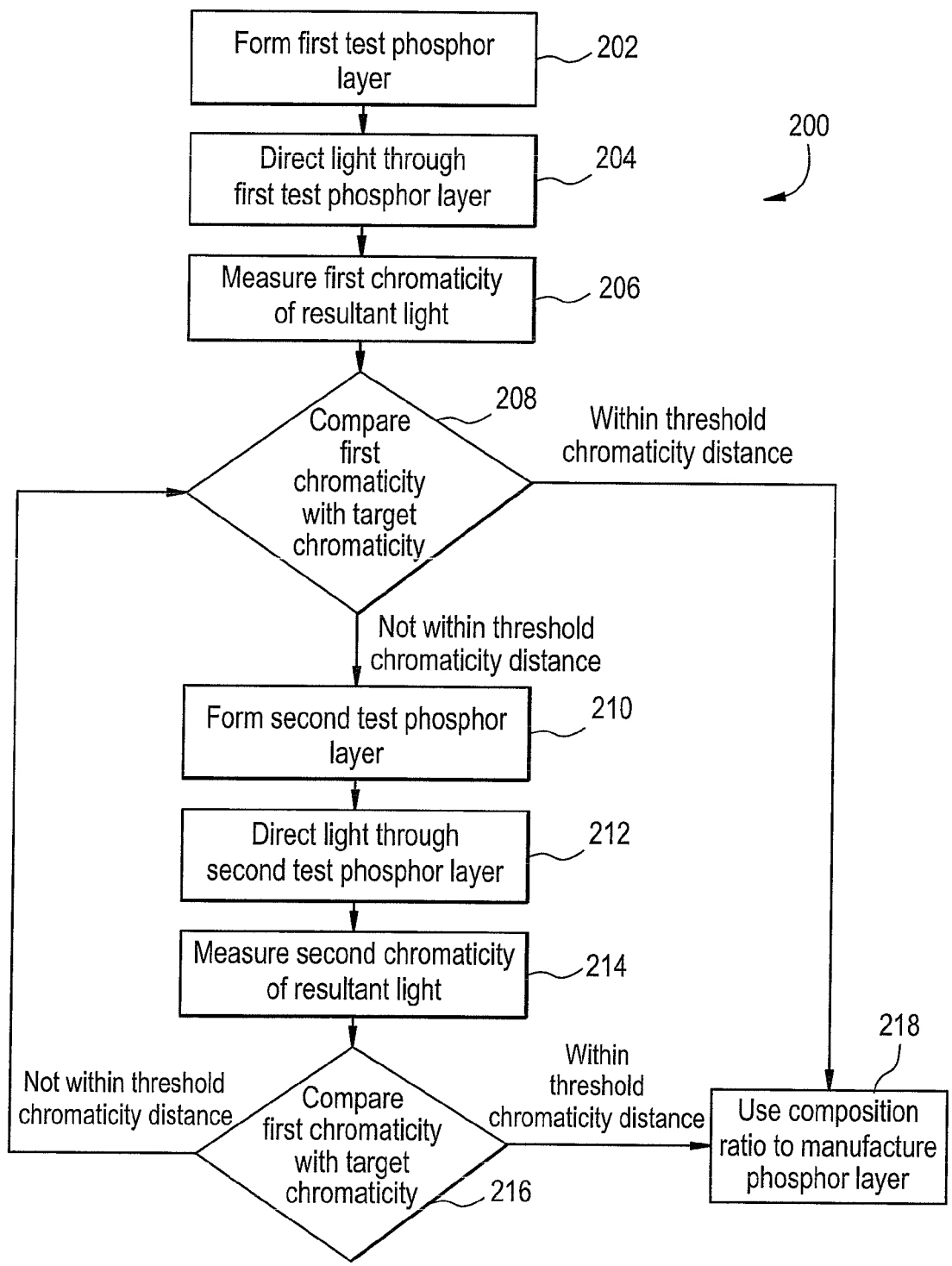
FIG. 5 is a flowchart depicting a method of manufacturing a phosphor layer for a light diffusing optical fiber, according to one or more embodiments shown and described herein.

Referring now to FIG. 5, a method of manufacturing a phosphor layer 140 for the light diffusing optical fiber 110 will now be described with specific reference to the flowchart 200 of FIG. 5 and general reference to the other figures. The flowchart 200 depicts a number of method steps, which, while described in a particular sequential order, are not limited to that sequential order. As described below, the method may be used to tune the composition ratio and thickness of the phosphor layer 140 such that the phosphor layer 140 emits a desired chromaticity of light when irradiated by the light source 152.

First, at step 202, the method comprises forming a first test phosphor layer comprising a combination of a base material (for example, an optical gel of one of the base materials described above), a first phosphor, and a second phosphor, which are combined at a first composition ratio. Moreover, the first test phosphor layer comprises a first phosphor layer thickness. Without intending to be limited by theory, both the thickness and the composition ratio of an individual phosphor layer 140 alter the chromaticity of light that traverses the phosphor layer 140. Next, at step 204, the method comprises directing light through the first test phosphor layer, for example, by irradiating the first test phosphor layer with light output by the light source 152 of the light output device 150. At step 206, the method comprises measuring the chromaticity (e.g., a "first chromaticity") of the resultant light that traverses the first test phosphor layer, for example, using any known or yet to be developed measurement device for measuring chromaticity.

Next, at step 208, the first chromaticity is compared to a target chromaticity. In some embodiments, the target chromaticity may be a white or near white chromaticity, for example, a chromaticity on or near the planckian locus. For example, the target chromaticity may be within the chromaticity region on a CIE 1976 chromaticity space defined by the first boundary line that extends parallel to the planckian locus at a distance of 0.02 Duv from the planckian locus, the second boundary line that extends parallel to the planckian locus at a distance of –0.02 Duv from the planckian locus, the third boundary line that extends between the first boundary line and the second boundary line along an isothermal line for a correlated color temperature of about 2000 K, and the fourth boundary line that extends between the first boundary line and the second boundary line along an isothermal line for a correlated color temperature of about 10000 K.

Referring still to FIG. 5, if the first chromaticity is within a threshold chromaticity distance from the target chromaticity, for example, within +0.02, +0.01, +0.0075, +0.005, ±0.0025, +0.001, or the like on the CIE 1976 chromaticity space, the method moves to step 218 and the first composition ratio may be used in manufacturing of the phosphor layer 140 for use as a coating and/or buffer tube for the light diffusing optical fiber 110 described herein. Alternatively, if the first chromaticity is not within the threshold chromaticity distance, the method moves to step 210, which comprises forming a second test phosphor layer comprising a combination of the base material, the first phosphor, and the second phosphor combined at a second composition ratio, which may be different than the first composition ratio (e.g., the composition ratio of the first test phosphor layer). It should be understood that while the method of FIG. 5 is described with respect to a threshold chromaticity distance, in embodiments in which the target chromaticity is a point along the planckian locus, the threshold chromaticity distance may be a threshold Duv. Further, the second test phosphor layer comprises a second phosphor layer thickness, which, in some embodiments, is different than the first phosphor layer thickness, for example, the second phosphor layer thickness may be larger or smaller than the first phosphor layer thickness and, as described above, a change in thickness may alter the resultant chromaticity. It should be understood that the second test phosphor layer may have a different composition ratio, a different thickness, or both a different composition ratio and a different thickness than the first test phosphor layer.

Next, at step 212, the method comprises directing light through the second test phosphor layer, for example, using the light source 152 of the light output device 150, and at step 214, measuring the chromaticity (e.g., the "second chromaticity") of the resultant light. Further, at the step 216, the method comprises comparing the second chromaticity to the target chromaticity and if the second chromaticity is within the threshold chromaticity distance from the target chromaticity, the method moves to step 218 and the second composition ratio may be used in manufacturing of the phosphor layer 140 for use as a coating and/or buffer tube for the light diffusing optical fiber 110.

In some embodiments, the second chromaticity is closer to the target chromaticity than the first chromaticity, for example, the second chromaticity may be within the chromaticity region on a CIE 1976 chromaticity space defined by the first boundary line that extends parallel to the planckian locus at a distance of 0.02 Duv from the planckian locus, the second boundary line that extends parallel to the planckian locus at a distance of –0.02 Duv from the planckian locus, the third boundary line that extends between the first boundary line and the second boundary line along an isothermal line for a correlated color temperature of about 2000 K, and the fourth boundary line that extends between the first boundary line and the second boundary line along an isothermal line for a correlated color temperature of about 10000 K. Alternatively, if the second chromaticity is not within the threshold chromaticity distance, the method moves back to step 210, and another test phosphor layer is formed having a different composition ratio and/or thickness than both the first test phosphor layer and the second test phosphor layer and steps 212-216 may be repeated for this additional composition ratio and/or thickness until a composition ratio and/or thickness is found which causes emission light to have a chromaticity within the threshold chromaticity distance.

Tests were performed on samples of a light diffusing optical fiber according to an embodiment of this disclosure. The samples were placed in a jacket including either a tight polymer layer or a loose tube and with tubes excluding the polymer layer. Samples were aged by exposing to a temperature of 85° C. and a chamber having a temperature of 85° C. and 85% relative humidity for up to 2000 hours.

Scattering efficiency of the light diffusing optical fiber along the spectral range from 420 nm to 800 nm in terms of how much light is scattered relative to the input light was evaluated. The input light included a blue LD light source (having a wavelength from 445 nm to 455 nm), green LD (having a wavelength from 520 nm to 532 nm), red diodes (having a wavelength from 630 nm or 650 nm), or a broadband white light source (e.g., a plasma laser source). The test was performed by placing the light diffusing fiber inside of large integrated sphere and all of the scattered light was captured by the detector. The amount of input light was measured by cutting back the light diffusing fiber to the start position of the fiber with the same sphere.

Tube transmission was also measured using an integrated sphere test where the amount of light transmitted was measured from a fiber having a jacket and the same fiber without a jacket.

Color point shift from a sample before aging and after aging was measured.

Figure 6:
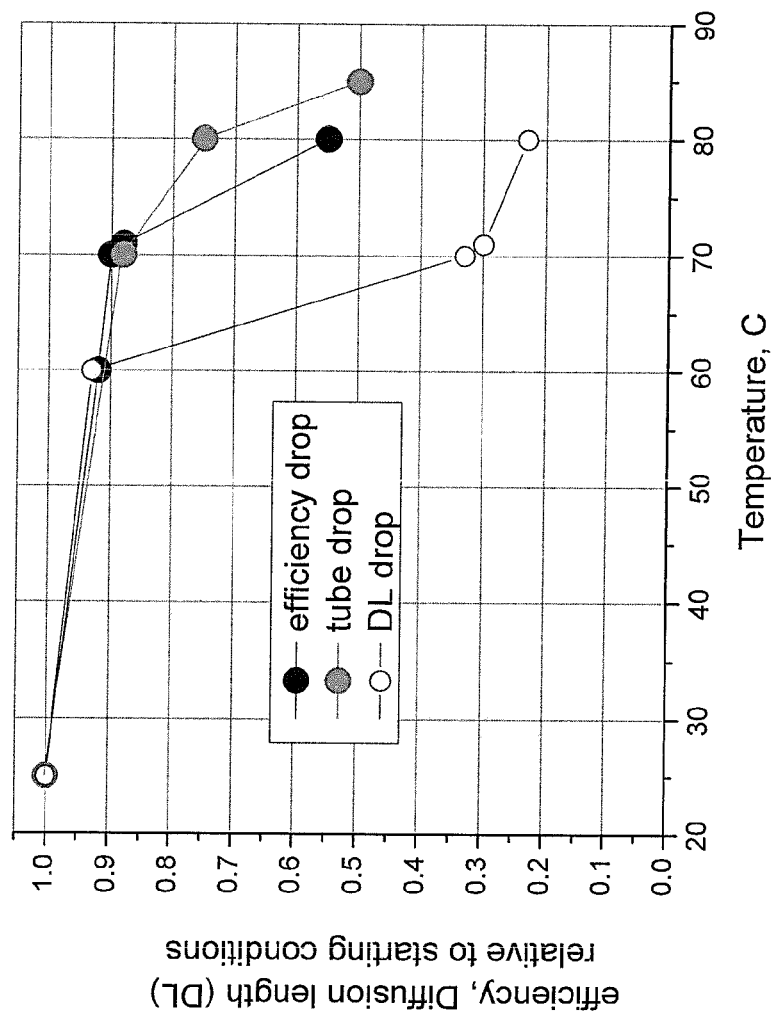
FIG. 6 is a plot showing a change in diffusion length and scattering efficiency in a light diffusing optical fiber sample having a buffer that is aged and a fiber without a buffer inserted in a tube that is aged.

An efficiency drop measured in a fiber may be the result of an absorption increases in the jacket material and absorption increase in the cladding. The latter may be product of the degradation of the primary coating itself. It also can be caused by outgassing of the buffer material. In the case of a PVC material, as it shown in FIG. 6, the one of the causes of scattering efficiency drop is cladding degradation. In particular, FIG. 6 shows a change in diffusion length and efficiency using a blue input light (having a wavelength from 455 nm to 460 nm) in a light diffusing optical fiber sample having a buffer that is aged and a fiber without a buffer inserted in a tube that is aged. In both instances, aging included exposure to a chamber at 85° and 85% relative humidity for 500 hours. In FIG. 6, the fiber scattering efficiency drop ("efficiency drop"), tube scattering efficiency drop ("tube drop") and diffusion length drop ("DL drop") are shown relative to before aging and after aging. In addition, delamination of the cladding may cause faster loss of the light leading to shorter diffusion length where light intensity drops by 10 dB (or 90% intensity loss) (diffusion length of light diffusing fiber), as shown in FIG. 6.

Figure 7:
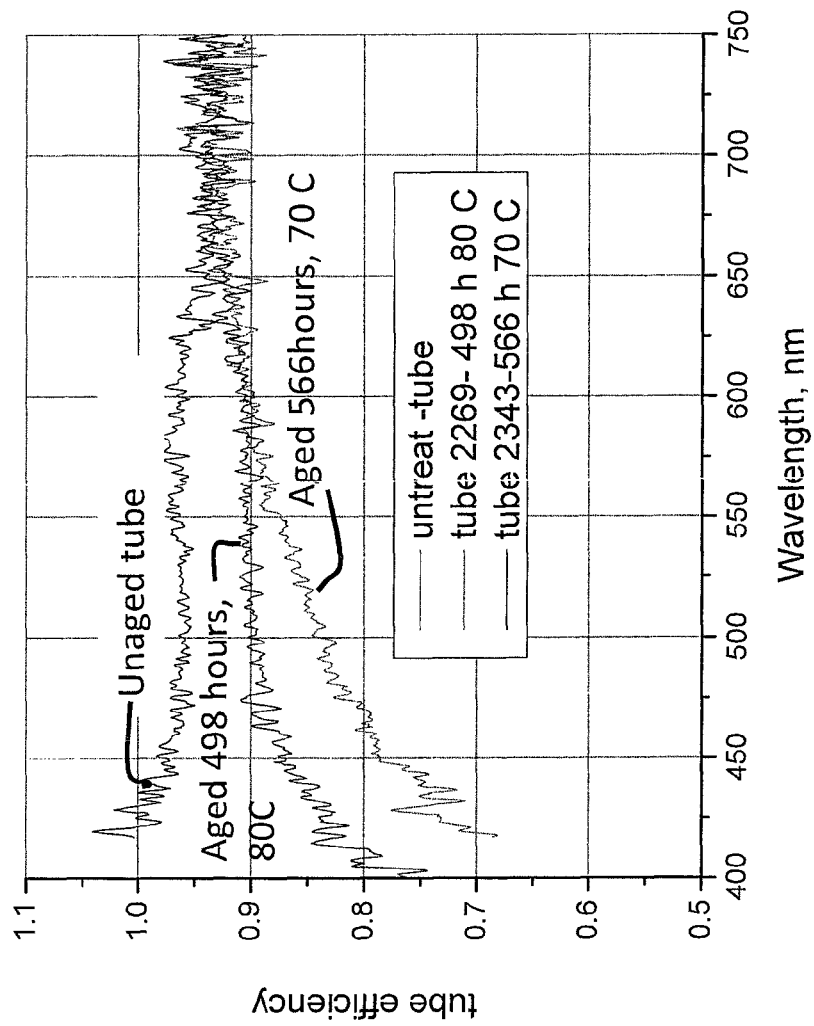
FIG. 7 is a plot showing the scattering efficiency for an aged PVC tube after aging.
Figure 8:
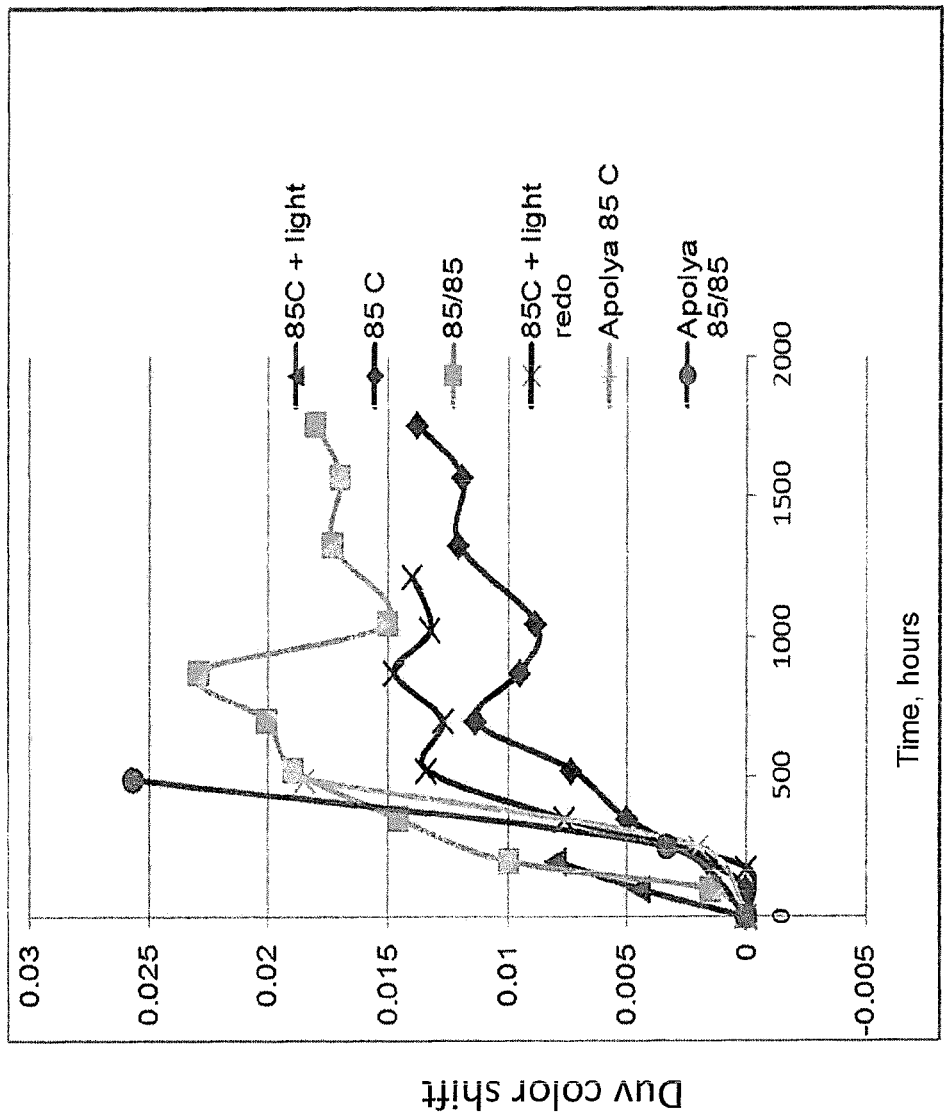
FIG. 8 is a plot showing changes in color point (Duv) in the CIE 1976 chromaticity space due to degradation of PVC and Apolhya material after aging.

Diffusion length was measured on sample of the fiber with a jacket (tight buffer), and the scattering efficiency was measured on the same fiber. The impact of the jacket was measured on un-aged fiber sample, which was placed inside of aged tube. Degradation of PVC tends to occur at temperatures from about 60° C. to about 80° C. FIG. 7 shows the full spectrum of scattering efficiency for an aged PVC tube after aging at 80° C. for 498 hours, and 70° C. for 566 hours. The PVC tube was placed over a fiber without a polymer layer. The degradation at lower temperatures in this range is believed to be due to outgassing of the PVC leading to delamination of the cladding (which is not believed to exhibit absorption losses at such temperatures). At higher temperatures, degradation is believed to be due to an absorption increase in the cladding, leading to both decrease of diffusion length and scattering efficiency. Finally, at higher temperatures in this range, the buffer begins to absorb the light, which is the main reason for the need for a new jacket material, and potentially different cladding. In the case of phosphors in the buffer layer at the blue portion of the spectrum leads to color point shift as shown in FIG. 8, and losses in color conversion. FIG. 8 shows changes in color point (Duv) in the CIE 1976 chromaticity space due to degradation of PVC and Apolhya material after aging at 85° C., aging at 85° C. and 85% relative humidity, aging at 85° C. when the fiber is lit with 300 mW of 450 nm light. As shown in FIG. 8, the fastest degradation occurred after aging at 85° C. and 85% relative humidity.

To overcome degradation, materials were selected that were more resilient to the aging tests described herein. These aging tests are generally predictors of long term performance under normal operating conditions; however, accurate prediction assumes knowledge or model of degradation, which may be different for different materials. Table 1 summarizes the results of the tests for different thermoplastics materials, which can be used as a buffer of the light diffusing optical fiber samples. The criteria for good performance includes sufficient initial transmittance of the materials in a tube configuration with a wall thickness of 200 μm, and relatively low degradation of transmission observed after a long term aging at 85° C. and 85% relative humidity.

TABLE 1

Absorption of the tube with light diffusing optical fiber sample placed inside at the 440-460 nm spectral band (to indicate yellowing) normalized to 200 μm wall thickness.

| Sample ID | thickness, mm | new | 168 1 week | 336 2 week | 504 3 week | 672 4 week | 840 5 week | 1008 6 week |
|---|---|---|---|---|---|---|---|---|
| EVA 705MJ | 0.46 | 1.59 | 5.46 | 6.63 | 10.28 | 10.73 | 12.21 | 13.05 |
| EVA 723.28 | 0.48 | 2.27 | 3.80 | | 7.78 | 8.38 | 9.79 | 12.66 |
| PTFE Zeus | 0.26 | 0.45 | | 0.25 | 0.88 | 2.82 | 1.97 | 0.55 |
| ETFE | 0.12 | 2.71 | −1.24 | 2.07 | 5.43 | −1.13 | 6.52 | 7.80 |
| FEP from zeus | 0.17 | 2.92 | 1.51 | 1.05 | 3.80 | 5.77 | 5.41 | 3.46 |
| Polycarbonate | 0.34 | 2.14 | 2.38 | 3.82 | 0.58 | 3.86 | 5.34 | 5.11 |
| Tritan Tx-1000 | 0.34 | 0.24 | 1.21 | 2.75 | 2.77 | 4.57 | 4.67 | 5.68 |
| Tritan TX-1500 | 0.49 | 0.17 | 1.04 | 1.86 | 5.06 | 2.52 | 3.14 | 3.26 |
| 630 Pebax | 0.13 | 1.89 | 4.67 | 11.03 | 15.08 | 12.25 | 24.04 | 28.85 |
| 8 (Pebox 630 lot 022307-07) | 0.13 | 1.35 | 8.23 | 13.98 | 13.92 | 19.35 | 26.36 | 29.61 |
| Pebax 1033 | 0.22 | 9.46 | 12.00 | 18.14 | 22.65 | 32.63 | | |
| Pebax 400cl | 0.12 | 15.45 | 21.45 | 33.39 | 36.72 | | | |
| Nylon | 0.07 | −3.63 | 9.25 | 16.08 | 12.93 | 44.39 | 58.96 | 57.06 |
| PVC large diameter | 0.55 | 14.57 | 16.48 | 17.43 | 19.77 | 22.22 | 24.77 | 26.60 |
| Teknor clear PVC from FIS | 0.17 | 4.06 | 14.69 | 27.19 | 36.91 | 38.09 | 46.40 | |
| PVC control | 0.23 | 19.36 | 27.32 | 10.66 | 14.11 | 18.71 | 18.74 | 25.26 |
| Hytrell Opaque | 0.17 | 11.42 | 22.15 | 27.85 | 32.75 | 37.99 | 44.27 | |
| Hytrell Clear | 0.17 | 2.32 | 14.96 | 38.98 | 50.21 | 61.18 | 68.87 | |
| Hytrell natural | 0.17 | 5.28 | 9.87 | 13.59 | 19.60 | 20.56 | 20.50 | |
| polyurethane SMC | 0.19 | 7.25 | 37.71 | 49.26 | 48.56 | 61.57 | 73.16 | |
| Schott | 0.64 | 3.78 | 9.55 | 13.60 | 15.54 | 15.37 | 17.15 | 19.38 |
| Pearlthane 15N-95UV TPU LT | 0.26 | 3.41 | 14.09 | 17.86 | 28.58 | 37.17 | | |
| Pearlthane 12T-92E (TPU 12T) | 0.36 | 5.02 | 9.99 | 15.23 | 15.48 | 20.76 | 23.11 | |
| Hitax Ca-10 | 0.27 | 3.78 | 10.84 | 15.04 | 18.64 | 22.68 | | |
| Aleflex Q200F | 0.25 | 6.76 | 17.39 | 26.15 | 32.95 | 38.02 | | |
| Softell CA02A | 0.31 | 2.32 | 14.56 | 19.70 | 21.24 | 25.42 | | |
| Adplex X101M | 0.33 | 5.38 | 13.96 | 18.42 | 24.10 | 27.70 | | |

Figure 9:
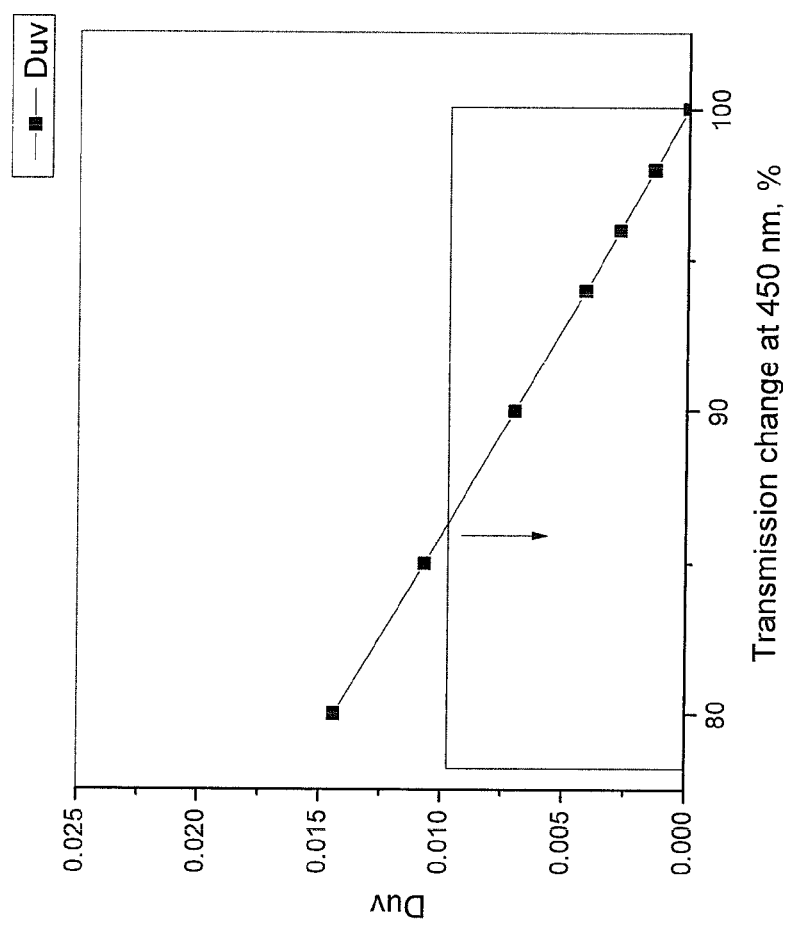
FIG. 9 is a plot showing color point shift (in Duv units) due loss of blue light in the light diffusing fiber with phosphor layer as a buffer, with color change temperature (CCT) around 4500 K.

Sufficient transmission efficiency means the initial transmission is greater than 90%, (i.e. absorption is less than 10%), and after aging, the transmission efficiency is 80-85% in the spectrum range from 420 nm to 800 nm. Yellowing of the material will lead to additional efficiency loss in blue part of the spectrum. This test limits certain range of materials, such as PVC. In addition, the color point shift for light diffusing fiber with a phosphor layer as a buffer should exhibit color point shift in emission light that is less than 0.02 or less than 0.01 in Duv units CIE 1976. FIG. 6 shows the correlation between Duv color point shift and transmission at wavelengths from 445 nm to 455 nm for white color light diffusing optical fiber with a phosphor layer as a buffer. The desirability of a different color point may require a different amount change of blue light transmittance to provide a color point shift in Duv units that is less than 0.01. It is believed that an absorptance of 10-15% should be in acceptable range for blue transmission to achieve this color point shift range, as shown in FIG. 9. In particular, FIG. 9 shows the color point shift or change in color point (in Duv units) due loss of blue light in the light diffusing fiber with phosphor layer as a buffer, with color change temperature (CCT) around 4500 K. Change in color shift change of Duv of 0.01 corresponds to the transmission drop of 15%.

Figure 10:
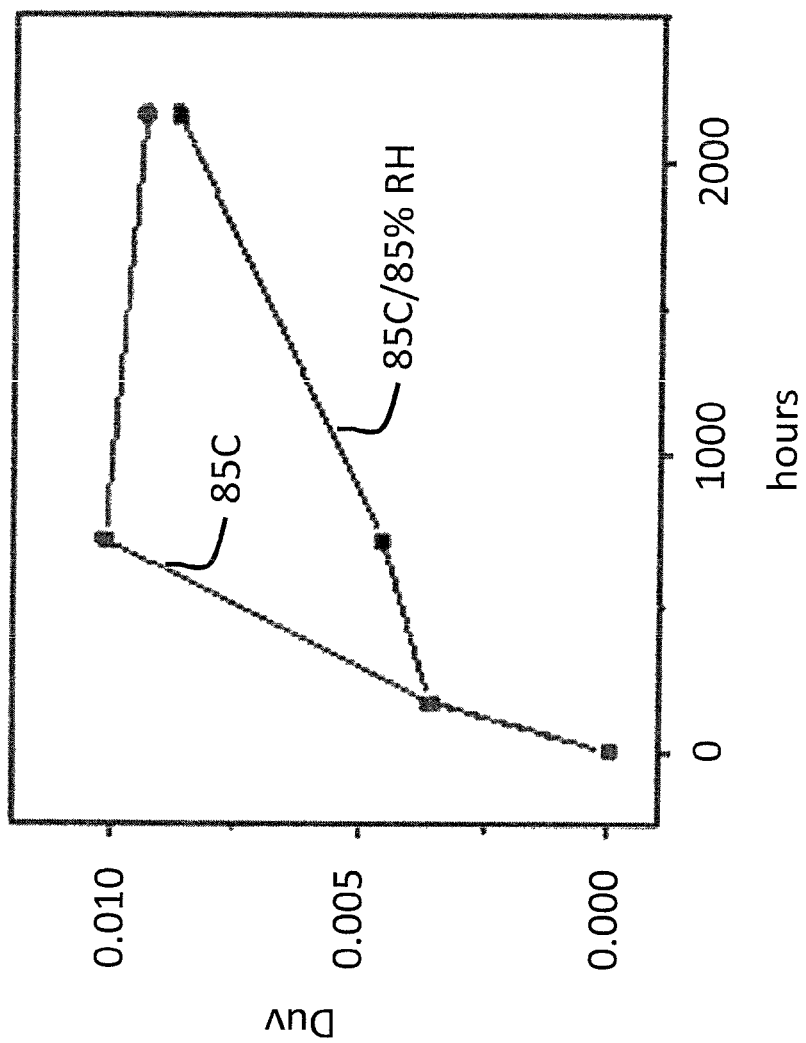
FIG. 10 is a plot showing a change in color point for a light diffusing fiber sample including EVA material after aging.
Figure 11:
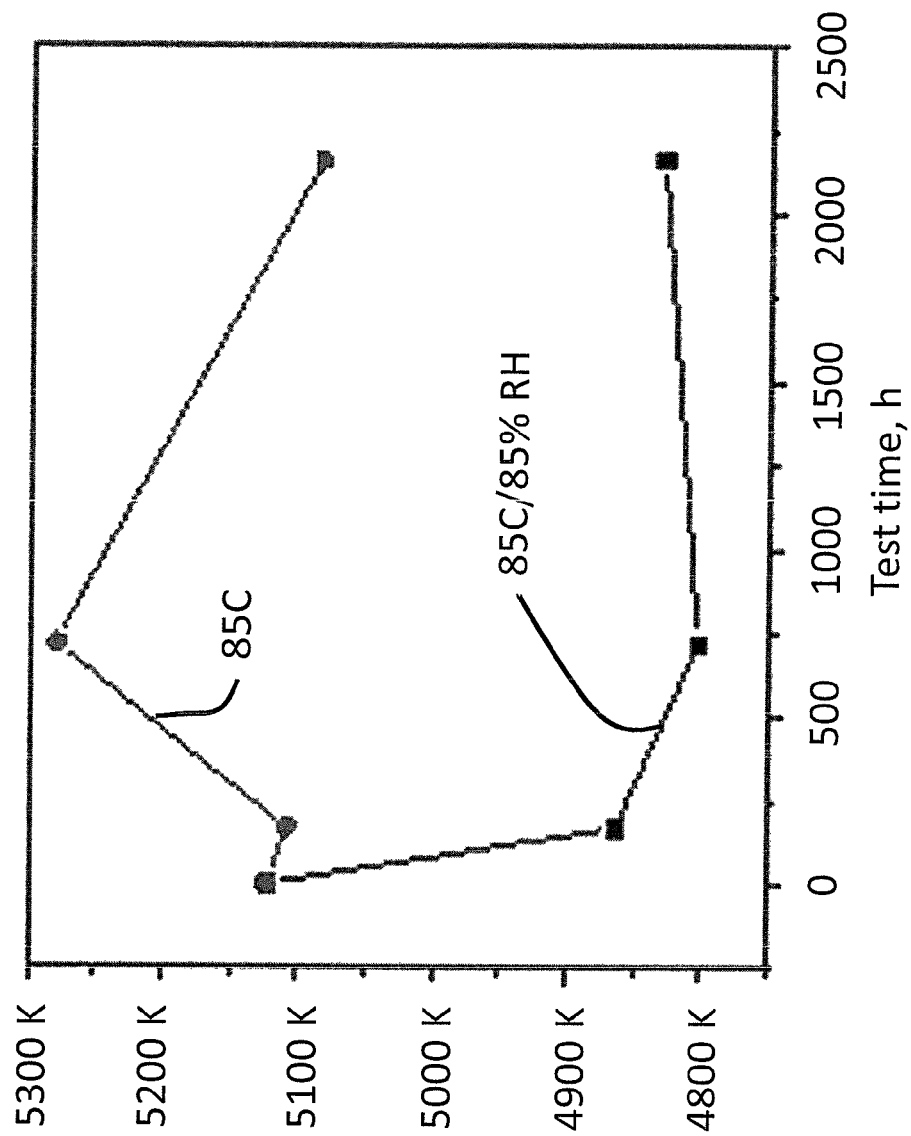
FIG. 11 is a plot showing CCT changes for the light diffusing fiber of FIG. 10.

Table 1 contains certain range of material satisfying the 15% transmission drop at 440-460 nm. The best performing materials were fluorinated polymers such as PTFE, ETFE, and FEP. Some of the materials like EVA approached the 15% transmission drop range. A thermoplastic phosphor layer as a buffer with EVA material was aged at 85° C. and 85% relative humidity for 2000 hours. The changes in color point for the 4900 K CCT color point was less than 0.01 without losses in color converting efficiency, as shown in FIG. 10 and FIG. 11. FIG. 11 shows the CCT changes for the same samples that are less than or equal to about 10%.

Aspect (1) of this disclosure pertains to a light diffusing optical fiber comprising: a glass core; a cladding surrounding the glass core; a phosphor layer surrounding the cladding; and a plurality of scattering structures positioned within the glass core, the cladding, or both the glass core and the cladding, wherein: the plurality of scattering structures are configured to scatter guided light toward the phosphor layer of the light diffusing optical fiber such that a portion of the guided light diffuses through the phosphor layer along a diffusion length of the light diffusing optical fiber, and the phosphor layer comprises two or more phosphors and is configured to convert guided light diffusing through the phosphor layer into emission light such that the color of the emission light comprises a chromaticity within a u'-v' chromaticity region on a CIE 1976 chromaticity space defined by: a first u'-v' boundary line that extends parallel to a planckian locus at a distance of 0.02 Duv from the planckian locus; a second u'-v' boundary line that extends parallel to the planckian locus at a distance of −0.02 Duv from the planckian locus; a third u'-v' boundary line that extends between the first u'-v' boundary line and the second u'-v' boundary line along an isothermal line for a correlated color temperature of about 2000 K; and a fourth u'-v' boundary line that extends between the first u'-v' boundary line and the second u'-v' boundary line along an isothermal line for a correlated color temperature of about 10000 K.

Aspect (2) of this disclosure pertains to the light diffusing optical fiber of Aspect (1), wherein the two or more phosphors comprise a red phosphor and a yellow phosphor.

Aspect (3) of this disclosure pertains to the light diffusing optical fiber of Aspect (1), wherein the two or more phosphors comprise phosphorescent or fluorescent materials.

Aspect (4) of this disclosure pertains to the light diffusing optical fiber of Aspect (3), wherein the phosphorescent or fluorescent materials comprise Ce-YAG, Nd-YAG, nitride, orthosilicate, sulfoselenide, quantum dots, nanoparticles, or a combination thereof.

Aspect (5) of this disclosure pertains to the light diffusing optical fiber of any one of Aspects (1) through (4), wherein: the phosphor layer further comprises a polymer base material; and the two or more phosphors are disposed within the polymer base material.

Aspect (6) of this disclosure pertains to the light diffusing optical fiber of any one of Aspects (1) through (5), wherein a scattering material is disposed within the phosphor layer.

Aspect (7) of this disclosure pertains to the light diffusing optical fiber of any one of Aspects (1) through (6), wherein the phosphor layer comprises a buffer tube.

Aspect (8) of this disclosure pertains to the light diffusing optical fiber of any one of Aspects (1) through (7), wherein: the first u'-v' boundary line of the u'-v' chromaticity region within which the chromaticity of the emission light is located on the CIE 1976 chromaticity space, extends parallel to the planckian locus at a distance of 0.01 Duv from the planckian locus; and the second u'-v' boundary line of the u'-v' chromaticity region within which the chromaticity of the emission light is located on the CIE 1976 chromaticity space, extends parallel to the planckian locus at a distance of −0.01 Duv from the planckian locus.

Aspect (9) of this disclosure pertains to the light diffusing optical fiber of any one of Aspects (1) through (8), wherein: the third u'-v' boundary line of the u'-v' chromaticity region within which the chromaticity of the emission light is located on the CIE 1976 chromaticity space, extends between the first u'-v' boundary line and the second u'-v' boundary line along an isothermal line for a correlated color temperature of about 2500 K; and the fourth u'-v' boundary line of the u'-v' chromaticity region within which the chromaticity of the emission light is located on the CIE 1976 chromaticity space, extends between the first u'-v' boundary line and the second u'-v' boundary line along an isothermal line for a correlated color temperature of about 8000 K.

Aspect (10) of this disclosure pertains to the light diffusing optical fiber of any one of Aspects (1) through (9), wherein the chromaticity of the emission light is located within the u'-v' chromaticity region defined by the first u'-v' boundary line, the second u'-v' boundary line, the third u'-v' boundary line, and the u'-v' fourth boundary line located on the CIE 1976 chromaticity space for all viewing angles from about 15° to about 170° relative to a propagation direction of the guided light.

Aspect (11) of this disclosure pertains to the light diffusing optical fiber of any one of Aspects (1) through (10), wherein the light diffusing optical fiber emits light having an intensity along the diffusion length that does not vary by more than about 20%.

Aspect (12) of this disclosure pertains to the light diffusing optical fiber of any one of Aspects (1) through (11), wherein the plurality of scattering structures are configured to scatter guided light toward the phosphor layer of the light diffusing optical fiber such that a portion of the guided light diffuses through an outer surface of the light diffusing optical fiber along the diffusion length of the light diffusing optical fiber to provide a scattering induced attenuation of about 50 dB/km or more.

Aspect (13) of this disclosure pertains to the light diffusing optical fiber of any one of Aspects (1) through (12), wherein: the light diffusing optical fiber comprises a secondary scattering layer surrounding the glass core and the cladding and positioned between the cladding and the phosphor layer; and the secondary scattering layer comprises a base material and a scattering material and is configured such that a difference between the minimum and maximum scattering illumination intensity is less than 50% of the maximum scattering illumination intensity, for all viewing angles between 40 and 120 degrees.

Aspect (14) of this disclosure pertains to the light diffusing optical fiber of Aspect (13), wherein the secondary scattering layer directly contacts the phosphor layer.

Aspect (15) of this disclosure pertains to the light diffusing optical fiber of Aspect (13), wherein the secondary scattering layer is spaced apart from the phosphor layer such that an air gap is disposed between the secondary scattering layer and the phosphor layer.

Aspect (16) of this disclosure pertains to the light diffusing optical fiber of any one of Aspects (13) through (15), wherein the scattering material of the secondary scattering layer comprises $TiO_2$, $SiO_2$, $Al_2O_3$, $ZrO_2$, $CeO_2$, $SnO_2$, $Sb_2O_3$, or a combination thereof.

Aspect (17) of this disclosure pertains to the light diffusing optical fiber of any one of Aspects (13) through (16), wherein the base material of the secondary scattering layer comprises a polymer.

Aspect (18) of this disclosure pertains to the light diffusing optical fiber of any one of Aspects (1) through (17), wherein the plurality of scattering structures comprise gas filled voids.

Aspect (19) of this disclosure pertains to the light diffusing optical fiber of any one of Aspects (1) through (18), wherein the cladding comprises a polymer.

Aspect (20) of this disclosure pertains to an illumination system comprising the light diffusing optical fiber of any one of Aspects (1) through (19) optically coupled to a light output device comprising a light source.

Aspect (21) of this disclosure pertains to the illumination system of Aspect (20), wherein light output by the light source and propagating along the light diffusing optical fiber comprises a wavelength from about 300 nm to about 460 nm.

Aspect (22) pertains to a method of manufacturing a phosphor layer for a light diffusing optical fiber, the method comprising: forming a first test phosphor layer comprising a combination of a base material, a first phosphor, and a second phosphor combined at a first composition ratio and having a first phosphor layer thickness; directing light through the first test phosphor layer; measuring a first chromaticity of light directed though the first test phosphor layer; and forming a second test phosphor layer comprising a combination of the base material, the first phosphor, and the second phosphor combined at a second composition ratio and having a second phosphor layer thickness, wherein: the second composition ratio is different than the first composition ratio; the second phosphor layer thickness is different than the first phosphor layer thickness; or both the second composition ratio and the second phosphor layer thickness are different than the first composition ratio and the first phosphor layer thickness, respectively, such that light directed through the second test phosphor layer comprises a second chromaticity that is closer to a target chromaticity than the first chromaticity.

Aspect (23) pertains to the method of Aspect (22), wherein the first phosphor comprises a red phosphor and the second phosphor comprises a yellow phosphor.

Aspect (24) pertains to the method of Aspect (22), wherein the first phosphor and the second phosphor each comprise phosphorescent or fluorescent materials.

Aspect (25) pertains to the method of Aspect (24), wherein the phosphorescent or fluorescent materials comprise Ce-YAG, Nd-YAG, nitride, orthosilicate, sulfoselenide, quantum dots, nanoparticles, or a combination thereof.

Aspect (26) pertains to the method of any one of Aspects (22) through (25), wherein the second phosphor layer thickness is larger than the first phosphor layer thickness.

Aspect (27) pertains to the method of any one of Aspects (22) through (26), wherein the second phosphor layer thickness is smaller than the first phosphor layer thickness.

Aspect (28) pertains to the method of any one of Aspects (22) through (27), wherein the second chromaticity and the target chromaticity are within a u'-v' chromaticity region on a CIE 1976 chromaticity space defined by: a first u'-v' boundary line that extends parallel to a planckian locus at a distance of 0.02 Duv from the planckian locus; a second u'-v' boundary line that extends parallel to the planckian locus at a distance of −0.02 Duv from the planckian locus; a third u'-v' boundary line that extends between the first u'-v' boundary line and the second u'-v' boundary line along an isothermal line for a correlated color temperature of about 2000 K; and a fourth u'-v' boundary line that extends between the first u'-v' boundary line and the second u'-v' boundary line along an isothermal line for a correlated color temperature of about 10000 K.

Aspect (29) pertains to the method of any one of Aspects (22) through (28), wherein the second chromaticity and the target chromaticity are within an x-y chromaticity region on a CIE 1931 chromaticity space defined by: a first x-y boundary line that extends from a first x-y chromaticity point located between about (0.15, 0.0) and (0.25, 0.0) and a second x-y chromaticity point located at about (0.4, 0.6); and a second x-y boundary line that extends from the first x-y chromaticity point and a third x-y chromaticity point located at about (0.6, 0.4).

Aspect (30) pertains to a light diffusing optical fiber comprising: a glass core; a cladding surrounding the glass core; a phosphor layer surrounding the cladding; and a plurality of scattering structures positioned within the glass core, the cladding, or both the glass core and the cladding, wherein: the plurality of scattering structures are configured to scatter guided light toward the phosphor layer of the light diffusing optical fiber such that a portion of the guided light diffuses through the phosphor layer along a diffusion length of the light diffusing optical fiber, and the phosphor layer comprises two or more phosphors and is configured to convert guided light diffusing through the phosphor layer into emission light such that the color of the emission light comprises a chromaticity within an x-y chromaticity region on a CIE 1931 chromaticity space defined by: a first x-y boundary line that extends from a first x-y chromaticity point located between about (0.15, 0.0) and (0.25, 0.0) and a second x-y chromaticity point located at about (0.4, 0.6); and a second x-y boundary line that extends from the first x-y chromaticity point and a third x-y chromaticity point located at about (0.6, 0.4).

Aspect (31) pertains to the light diffusing optical fiber of Aspect (30), wherein the two or more phosphors comprise a red phosphor and a yellow phosphor.

Aspect (32) pertains to the light diffusing optical fiber of Aspect (30), wherein the two or more phosphors comprise phosphorescent or fluorescent materials.

Aspect (33) pertains to the light diffusing optical fiber of Aspect (32), wherein the phosphorescent or fluorescent materials comprise Ce-YAG, Nd-YAG, nitride, orthosilicate, sulfoselenide, quantum dots, nanoparticles, or a combination thereof.

Aspect (34) pertains to the light diffusing optical fiber of any one of Aspects (30) through (33), wherein: the phosphor layer further comprises a polymer base material; and the two or more phosphors are disposed within the polymer base material.

Aspect (35) pertains to the light diffusing optical fiber of any one of Aspects (30) through (34), wherein a scattering material is disposed within the phosphor layer.

Aspect (36) pertains to the light diffusing optical fiber of any one of Aspects (30) through (35), wherein the phosphor layer comprises a buffer tube.

Aspect (37) pertains to the light diffusing optical fiber of any one of Aspects (30) through (36), wherein the chromaticity of the emission light is located within the x-y chromaticity region defined by the first x-y boundary line and the second x-y boundary line located on the CIE 1931 chromaticity space for all viewing angles from about 15° to about 170° relative to a propagation direction of the guided light.

Aspect (38) pertains to the light diffusing optical fiber of any one of Aspects (30) through (37), wherein the light diffusing optical fiber emits light having an intensity along the diffusion length that does not vary by more than about 20%.

Aspect (39) pertains to the light diffusing optical fiber of any one of Aspects (30) through (38), wherein the plurality of scattering structures are configured to scatter guided light toward the phosphor layer of the light diffusing optical fiber such that a portion of the guided light diffuses through an outer surface of the light diffusing optical fiber along the diffusion length of the light diffusing optical fiber to provide a scattering induced attenuation of about 50 dB/km or more.

Aspect (40) pertains to the light diffusing optical fiber of any one of Aspects (30) through (39), wherein: the light diffusing optical fiber comprises a secondary scattering layer surrounding the glass core and the cladding and positioned between the cladding and the phosphor layer; and the secondary scattering layer comprises a base material and a scattering material and is configured such that a difference between the minimum and maximum scattering illumination intensity is less than 50% of the maximum scattering illumination intensity, for all viewing angles between 40 and 120 degrees.

Aspect (41) pertains to the light diffusing optical fiber of Aspect (40), wherein the secondary scattering layer directly contacts the phosphor layer.

Aspect (42) pertains to the light diffusing optical fiber of Aspect (40), wherein the secondary scattering layer is spaced apart from the phosphor layer such that an air gap is disposed between the secondary scattering layer and the phosphor layer.

Aspect (43) pertains to the light diffusing optical fiber of any one of Aspects (40) through (42), wherein the scattering material of the secondary scattering layer comprises $TiO_2$, $SiO_2$, $Al_2O_3$, $ZrO_2$, $CeO_2$, $SnO_2$, $Sb_2O_3$, or a combination thereof.

Aspect (44) pertains to the light diffusing optical fiber of any one of Aspects (40) through (43), wherein the base material of the secondary scattering layer comprises a polymer.

Aspect (45) pertains to the light diffusing optical fiber of any one of Aspects (40) through (44), wherein the plurality of scattering structures comprise gas filled voids.

Aspect (46) pertains to the light diffusing optical fiber of any one of Aspects (30) through (45), wherein the cladding comprises a polymer.

Aspect (47) pertains to an illumination system comprising the light diffusing optical fiber of any one of Aspects (30) through (46) optically coupled to a light output device comprising a light source.

Aspect (48) pertains to the illumination system of Aspect (47), wherein light output by the light source and propagating along the light diffusing optical fiber comprises a wavelength from about 300 nm to about 460 nm.

Aspect (49) pertains to a light diffusing optical fiber comprising: a first end, a second end opposing the first end, a length between the first end 112 and the second end 114, a glass core extending along the length; and a cladding surrounding at least a portion of the glass core; a polymer layer surrounding the cladding; and wherein the fiber is configured to scatter a guided light propagating along the light diffusing optical fiber toward an outer surface of the light diffusing optical fiber such that a portion of the guided light diffuses through the polymer layer along a diffusion length of the light diffusing optical fiber, wherein, after the light diffusing fiber is aged by placing the fiber in a chamber having a temperature of 85° C. and 85% relative humidity for 100 hours, for 100 hours to 500 hours, or up to 2000 hours, and after a light source is optically coupled to the first end, the light diffusing fiber exhibits any one of: an optical loss that changes about 20% or less, a scattering efficiency that changes about 10% or less, and a brightness at any given portion of the fiber along the length that changes less than 25%.

Aspect (50) pertains to the light diffusing optical fiber of Aspect (49), further comprising a plurality of scattering structures positioned within the glass core, the cladding, or both the glass core and the cladding, wherein the plurality of scattering structures are configured to scatter guided light toward the outer surface of the light diffusing optical fiber such that a portion of the guided light diffuses through the polymer layer along a diffusion length of the light diffusing optical fiber that is converted into emission light having a color point in the CIE 1976 chromaticity space, wherein after aging the color point shifts about 0.02 or less.

Aspect (51) pertains to the light diffusing optical fiber of Aspect (49) or Aspect (50), further comprising a luminous efficiency, wherein the luminous efficiency changes less than 20% after aging.

Aspect (52) pertains to the light diffusing optical fiber of any one of Aspects (49) through (51), wherein the polymer layer comprises any one of ethylene vinyl acetate (EVA), polytetrafluoroethylene (PTFE), ethylene tetrafluoroethylene (ETFE), fluorinated ethylene propylene (FEP), Perfluoroalkoxy Alkane (PFA), polycarbonate, a copolyester and silicone.

Aspect (53) pertains to the light diffusing optical fiber of any one of Aspects (49) through (52), further comprising two or more phosphors in the polymer layer, wherein the polymer layer is configured to convert guided light diffusing through the polymer layer into emission light such that the color of the emission light comprises a chromaticity within a u'-v' chromaticity region on a CIE 1976 chromaticity space defined by: a first u'-v' boundary line that extends parallel to a planckian locus at a distance of 0.02 Duv from the planckian locus; a second u'-v' boundary line that extends parallel to the planckian locus at a distance of −0.02 Duv from the planckian locus; a third u'-v' boundary line that extends between the first u'-v' boundary line and the second u'-v' boundary line along an isothermal line for a correlated color temperature of about 2000 K; and a fourth u'-v' boundary line that extends between the first u'-v' boundary line and the second u'-v' boundary line along an isothermal line for a correlated color temperature of about 10000 K.

Aspect (54) pertains to the light diffusing optical fiber of Aspect (53), wherein the two or more phosphors comprise a red phosphor and a yellow phosphor.

Aspect (55) pertains to the light diffusing optical fiber of Aspect (53), wherein the two or more phosphors comprise phosphorescent or fluorescent materials.

Aspect (56) pertains to the light diffusing optical fiber of Aspect (54) or Aspect (55), wherein the phosphorescent or fluorescent materials comprise Ce-YAG, Nd-YAG, nitride, orthosilicate, sulfoselunide, quantum dots, nanoparticles, or a combination thereof.

Aspect (57) pertains to the light diffusing optical fiber of any one of Aspects (53) through (56), wherein a scattering material is disposed within the polymer layer.

Aspect (58) pertains to the light diffusing optical fiber of any one of Aspects (53) through (57), wherein: the first u'-v' boundary line of the u'-v' chromaticity region within which the chromaticity of the emission light is located on the CIE 1976 chromaticity space, extends parallel to the planckian locus at a distance of 0.01 Duv from the planckian locus; and the second u'-v' boundary line of the u'-v' chromaticity region within which the chromaticity of the emission light is located on the CIE 1976 chromaticity space, extends parallel to the planckian locus at a distance of −0.01 Duv from the planckian locus.

Aspect (59) pertains to the light diffusing optical fiber of any one of Aspects (53) through (58), wherein: the third u'-v' boundary line of the u'-v' chromaticity region within which the chromaticity of the emission light is located on the CIE 1976 chromaticity space, extends between the first u'-v' boundary line and the second u'-v' boundary line along an isothermal line for a correlated color temperature of about 2500 K; and the fourth u'-v' boundary line of the u'-v' chromaticity region within which the chromaticity of the emission light is located on the CIE 1976 chromaticity space, extends between the first u'-v' boundary line and the second u'-v' boundary line along an isothermal line for a correlated color temperature of about 8000 K.

Aspect (60) pertains to the light diffusing optical fiber of any one of Aspects (53) through (59), wherein the chromaticity of the emission light is located within the u'-v' chromaticity region defined by the first u'-v' boundary line, the second u'-v' boundary line, the third u'-v' boundary line, and the u'-v' fourth boundary line located on the CIE 1976 chromaticity space for all viewing angles from about 15° to about 170° relative to a propagation direction of the guided light.

Aspect (61) pertains to the light diffusing optical fiber of any one of Aspects (53) through (60), wherein the light diffusing optical fiber emits light having an intensity along the diffusion length that does not vary by more than about 20%.

Aspect (62) pertains to the light diffusing optical fiber of any one of Aspects (53) through (61), wherein the plurality of scattering structures are configured to scatter guided light toward the polymer layer of the light diffusing optical fiber such that a portion of the guided light diffuses through an outer surface of the light diffusing optical fiber along the diffusion length of the light diffusing optical fiber to provide a scattering induced attenuation of about 50 dB/km or more.

Aspect (63) pertains to the light diffusing optical fiber of any one of Aspects (53) through (62), wherein: the light diffusing optical fiber comprises a secondary scattering layer surrounding the glass core and the cladding and positioned between the cladding and the polymer layer; and the secondary scattering layer comprises a base material and a scattering material and is configured such that a difference between the minimum and maximum scattering illumination intensity is less than 50% of the maximum scattering illumination intensity, for all viewing angles between 40 and 120 degrees.

Aspect (64) pertains to the light diffusing optical fiber of Aspect (63), wherein the secondary scattering layer directly contacts the polymer layer or is spaced apart from the polymer layer such that an air gap is disposed between the secondary scattering layer and the polymer layer.

Aspect (65) pertains to an illumination system comprising the light diffusing optical fiber of any one of Aspects (49) through (64) optically coupled to a light output device comprising a light source.

Aspect (66) pertains to the illumination system of Aspect (65), wherein light output by the light source and propagating along the light diffusing optical fiber comprises a wavelength from about 300 nm to about 520 nm.

For the purposes of describing and defining the present inventive technology, it is noted that reference herein to a variable being a "function" of a parameter or another variable is not intended to denote that the variable is exclusively a function of the listed parameter or variable. Rather, reference herein to a variable that is a "function" of a listed parameter is intended to be open ended such that the variable may be a function of a single parameter or a plurality of parameters.

It is also noted that recitations herein of "at least one" component, element, etc., should not be used to create an inference that the alternative use of the articles "a" or "an" should be limited to a single component, element, etc.

It is noted that recitations herein of a component of the present disclosure being "configured" in a particular way, to embody a particular property, or function in a particular manner, are structural recitations, as opposed to recitations of intended use. More specifically, the references herein to the manner in which a component is "configured" denotes an existing physical condition of the component and, as such, is to be taken as a definite recitation of the structural characteristics of the component.

For the purposes of describing and defining the present inventive technology it is noted that the terms "substantially" and "about" are utilized herein to represent the inherent degree of uncertainty that may be attributed to any quantitative comparison, value, measurement, or other representation. The terms "substantially" and "about" are also utilized herein to represent the degree by which a quantitative representation may vary from a stated reference without resulting in a change in the basic function of the subject matter at issue.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

It is noted that one or more of the following claims utilize the term "wherein" as a transitional phrase. For the purposes of defining the present inventive technology, it is noted that this term is introduced in the claims as an open-ended transitional phrase that is used to introduce a recitation of a series of characteristics of the structure and should be interpreted in like manner as the more commonly used open-ended preamble term "comprising."

What is claimed is:

1. A light diffusing optical fiber comprising:
a glass core;
a cladding surrounding the glass core;
a phosphor layer surrounding the cladding; and
a plurality of scattering structures positioned within the glass core, the cladding, or both the glass core and the cladding, wherein:
   the plurality of scattering structures are configured to scatter guided light toward the phosphor layer of the light diffusing optical fiber such that a portion of the guided light diffuses through the phosphor layer along a diffusion length of the light diffusing optical fiber, and
   the phosphor layer comprises two or more phosphors and is configured to convert guided light diffusing through the phosphor layer into emission light such that the color of the emission light comprises a chromaticity within a u'-v' chromaticity region on a CIE 1976 chromaticity space defined by:
      a first u'-v' boundary line that extends parallel to a planckian locus at a distance of 0.02 Duv from the planckian locus;
      a second u'-v' boundary line that extends parallel to the planckian locus at a distance of −0.02 Duv from the planckian locus;
      a third u'-v' boundary line that extends between the first u'-v' boundary line and the second u'-v' boundary line along an isothermal line for a correlated color temperature of about 2000 K; and
   a fourth u'-v' boundary line that extends between the first u'-v' boundary line and the second u'-v' boundary line along an isothermal line for a correlated color temperature of about 10000 K;
wherein the phosphor layer comprises a buffer tube.

2. The light diffusing optical fiber of claim 1, wherein the light diffusing optical fiber emits light having an intensity along the diffusion length that does not vary by more than about 40%.

3. An illumination system comprising the light diffusing optical fiber of claim 1 optically coupled to a light output device comprising a light source.

4. The illumination system of claim 3, wherein light output by the light source and propagating along the light diffusing optical fiber comprises a wavelength from about 300 nm to about 520 nm.

5. The light diffusing optical fiber of claim 1, wherein the two or more phosphors comprise a red phosphor and a yellow phosphor.

6. The light diffusing optical fiber of claim 1, wherein the two or more phosphors comprise phosphorescent or fluorescent materials.

7. The light diffusing optical fiber of claim 6, wherein the phosphorescent or fluorescent materials comprise Ce-YAG, Nd-YAG, nitride, orthosilicate, sulfoselenide, quantum dots, nanoparticles, or a combination thereof.

8. The light diffusing optical fiber of claim 1, wherein:
the phosphor layer further comprises a polymer base material; and
the two or more phosphors are disposed within the polymer base material.

9. A light diffusing optical fiber comprising:
a glass core;
a cladding surrounding the glass core;
a phosphor layer surrounding the cladding; and
a plurality of scattering structures positioned within the glass core, the cladding, or both the glass core and the cladding, wherein:
   the plurality of scattering structures are configured to scatter guided light toward the phosphor layer of the light diffusing optical fiber such that a portion of the guided light diffuses through the phosphor layer along a diffusion length of the light diffusing optical fiber, and
   the phosphor layer comprises two or more phosphors and is configured to convert guided light diffusing through the phosphor layer into emission light such that the color of the emission light comprises a chromaticity within an x-y chromaticity region on a CIE 1931 chromaticity space defined by:
      a first x-y boundary line that extends from a first x-y chromaticity point located between about (0.15, 0.0) and (0.25, 0.0) and a second x-y chromaticity point located at about (0.4, 0.6); and
      a second x-y boundary line that extends from the first x-y chromaticity point and a third x-y chromaticity point located at about (0.6, 0.4);
   wherein a scattering material is disposed within the phosphor layer, and wherein the phosphor layer comprises a buffer tube.

10. The light diffusing optical fiber of claim 9, wherein the two or more phosphors comprise a red phosphor and a yellow phosphor.

11. The light diffusing optical fiber of claim 9, wherein the two or more phosphors comprise phosphorescent or fluorescent materials.

12. The light diffusing optical fiber of claim 11, wherein the phosphorescent or fluorescent materials comprise Ce-YAG, Nd-YAG, nitride, orthosilicate, sulfoselenide, quantum dots, nanoparticles, or a combination thereof.

13. The light diffusing optical fiber of claim 9, wherein the chromaticity of the emission light is located within the x-y chromaticity region defined by the first x-y boundary line and the second x-y boundary line located on the CIE 1931 chromaticity space for all viewing angles from about 15° to about 170° relative to a propagation direction of the guided light.

14. The light diffusing optical fiber of claim 9, wherein the light diffusing optical fiber emits light having an intensity along the diffusion length that does not vary by more than about 20%.

15. An illumination system comprising the light diffusing optical fiber of claim 9 optically coupled to a light output device comprising a light source.

16. The illumination system of claim 15, wherein light output by the light source and propagating along the light diffusing optical fiber comprises a wavelength from about 300 nm to about 520 nm.

17. A light diffusing optical fiber comprising:
a first end, a second end opposing the first end,
a length between the first end and the second end,
a glass core extending along the length; and
a cladding surrounding at least a portion of the glass core;
a polymer layer surrounding the cladding; and
wherein the fiber is configured to scatter a guided light propagating along the light diffusing optical fiber toward an outer surface of the light diffusing optical fiber such that a portion of the guided light diffuses through the polymer layer along a diffusion length of the light diffusing optical fiber;

wherein, after the light diffusing fiber is aged by placing the fiber in a chamber having a temperature of 85° C. and 85% relative humidity for 100 hours, and after a light source is optically coupled to the first end, the light diffusing fiber exhibits any one of:

an optical loss that changes about 20% or less, a scattering efficiency in a spectral range from 420 nm to 800 nm that changes about 10% or less, and a brightness at any given portion of the fiber along the length that changes less than 25%;

wherein the polymer layer comprises two or more phosphors; and wherein the polymer layer comprises a buffer tube.

18. The light diffusing optical fiber of claim 17 comprises a plurality of scattering structures positioned within the glass core, the cladding, or both the glass core and the cladding, wherein the plurality of scattering structures are configured to scatter guided light toward the outer surface of the light diffusing optical fiber such that a portion of the guided light diffuses through the polymer layer along a diffusion length of the light diffusing optical fiber that is converted into emission light having a color point in Duv units in the CIE 1976 chromaticity space, wherein after aging the color point shifts about 0.02 or less.

19. The light diffusing optical fiber of claim 17, wherein the polymer layer configured to convert guided light diffusing through the polymer layer into emission light such that the color of the emission light comprises a chromaticity within a u'-v' chromaticity region on a CIE 1976 chromaticity space defined by:

a first u'-v' boundary line that extends parallel to a planckian locus at a distance of 0.02 Duv from the planckian locus;

a second u'-v' boundary line that extends parallel to the planckian locus at a distance of −0.02 Duv from the planckian locus;

a third u'-v' boundary line that extends between the first u'-v' boundary line and the second u'-v' boundary line along an isothermal line for a correlated color temperature of about 2000 K; and a fourth u'-v' boundary line that extends between the first u'-v' boundary line and the second u'-v' boundary line along an isothermal line for a correlated color temperature of about 10000 K.

* * * * *

UNITED STATES PATENT AND TRADEMARK OFFICE
CERTIFICATE OF CORRECTION

PATENT NO. : 11,059,747 B2
APPLICATION NO. : 16/496625
DATED : July 13, 2021
INVENTOR(S) : Stephan Lvovich Logunov et al.

It is certified that error appears in the above-identified patent and that said Letters Patent is hereby corrected as shown below:

In the Specification

In Column 1, Lines 4-5, delete "APPLICATIONS07.54.1" and insert -- APPLICATIONS --, therefor.

In Column 1, Line 7, after "This application" insert -- is a national stage application under 35 U.S. C. § 371 of International Patent Application Ser. No. PCT/US2018/024744, filed on Mar. 28, 2018, which --.

In Column 1, Line 11, delete "content" and insert -- contents --, therefor.

In Column 1, Line 11, delete "is" and insert -- are --, therefor.

In Column 1, Line 12, delete "entirety." and insert -- entireties. --, therefor.

Signed and Sealed this
Fifth Day of April, 2022

Drew Hirshfeld
*Performing the Functions and Duties of the*
*Under Secretary of Commerce for Intellectual Property and*
*Director of the United States Patent and Trademark Office*